United States Patent
Morimoto et al.

(10) Patent No.: US 8,958,275 B2
(45) Date of Patent: Feb. 17, 2015

(54) INFORMATION RECORDING METHOD, INFORMATION RECORDING APPARATUS, INFORMATION RECORDING MEDIUM, AND MEDIUM ESTIMATING METHOD

(71) Applicants: Hitachi Consumer Electronics Co., Ltd., Tokyo (JP); Hitachi-LG Data Storage, Inc., Tokyo (JP)

(72) Inventors: Yoshitaka Morimoto, Kodaira (JP); Soichiro Eto, Tokyo (JP); Koichi Watanabe, Hachioji (JP)

(73) Assignees: Hitachi Consumer Electronics Co., Ltd., Tokyo (JP); Hitachi-LG Data Storage, Inc., Tokyo (JP)

( * ) Notice: Subject to any disclaimer, the term of this patent is extended or adjusted under 35 U.S.C. 154(b) by 0 days.

(21) Appl. No.: 13/891,670

(22) Filed: May 10, 2013

(65) Prior Publication Data

US 2014/0022881 A1 Jan. 23, 2014

(30) Foreign Application Priority Data

Jul. 20, 2012 (JP) ................................. 2012-161129

(51) Int. Cl.
*G11B 7/0045* (2006.01)
*G11B 27/36* (2006.01)
*G11B 7/1267* (2012.01)
*G11B 7/006* (2006.01)

(52) U.S. Cl.
CPC ............ *G11B 7/1267* (2013.01); *G11B 7/0062* (2013.01)
USPC .................. 369/59.11; 369/47.51; 369/53.31

(58) Field of Classification Search
None
See application file for complete search history.

(56) References Cited

U.S. PATENT DOCUMENTS

| | | | |
|---|---|---|---|
| 2007/0206475 A1* | 9/2007 | Tamaki et al. ............. | 369/59.12 |
| 2007/0291621 A1* | 12/2007 | Aoyama et al. ............... | 369/116 |
| 2008/0298185 A1* | 12/2008 | Nakagawa et al. .......... | 369/47.5 |
| 2009/0213708 A1* | 8/2009 | Kusanagi ...................... | 369/47.5 |
| 2010/0232268 A1* | 9/2010 | Shintani et al. ............. | 369/47.5 |
| 2010/0260025 A1 | 10/2010 | Minemura et al. | |
| 2011/0013499 A1* | 1/2011 | Muto et al. ................. | 369/53.44 |
| 2011/0069600 A1* | 3/2011 | Suzuki ..................... | 369/112.23 |
| 2011/0164487 A1* | 7/2011 | Kobayashi et al. ........ | 369/59.21 |
| 2012/0224466 A1* | 9/2012 | Neo et al. ................... | 369/59.11 |

FOREIGN PATENT DOCUMENTS

| | | |
|---|---|---|
| JP | 2004-200868 | 7/2004 |
| JP | 2004-253114 | 9/2004 |
| WO | WO 2010/001588 A1 | 1/2010 |

\* cited by examiner

*Primary Examiner* — Thang Tran
(74) *Attorney, Agent, or Firm* — Antonelli, Terry, Stout & Kraus, LLP.

(57) ABSTRACT

A recording waveform is adjusted based on the fluctuation amount of the mark edge position, focused on that fluctuation of a mark edge position is increased in aged deterioration of a recording signal. Specifically, the recording waveform is adjusted such that a fluctuation amount becomes minimum or a threshold value or less. Then, information is recorded on the optical disc using the recording waveform. Further, provided is a recording medium or an information recording apparatus which stores parameters of the recording waveform.

15 Claims, 24 Drawing Sheets

| Pw | 12.7 mW |
|---|---|
| Pm | 8.76 mW |
| Ps | 3.81 mW |
| Pc | 0.20 mW |

| Mark | 2T | 3T | 4T | ≧5T |
|---|---|---|---|---|
| dTtop | -22 | -15 | -17 | -15 |
| Ttop | 55 | 59 | 38 | 47 |
| dTc | / | 7 | -5 | -6 |
| Tlp | / | / | 31 | 32 |
| dTs | -13 | -8 | -7 | -7 |

※ UNIT OF dTtop, Ttop, dTc, Tlp, dTS ARE 1/32T

| Pw | 14.5 mW |
|---|---|
| Pm | 10.0 mW |
| Ps | 4.35 mW |
| Pc | 0.20 mW |

| Mark | 2T | 3T | 4T | ≧5T |
|---|---|---|---|---|
| dTtop | -16 | -11 | -7 | -7 |
| Ttop | 49 | 48 | 40 | 40 |
| dTc | / | 5 | -9 | -8 |
| Tlp | / | / | 31 | 32 |
| dTs | -13 | -10 | -13 | -9 |

※ UNIT OF dTtop, Ttop, dTc, Tlp, dTS ARE 1/32T

```
X-axis
  [before correction] reproducing power
  [after correction] reading power
```

| Pw | 13.5 mW |
|----|---------|
| Pm | 9.31 mW |
| Ps | 4.05 mW |
| Pc | 0.20 mW |

| Mark | 2T | 3T | 4T | ≧5T |
|------|----|----|----|-----|
| dTtop | -19 | -13 | -11 | -11 |
| Ttop | 52 | 50 | 40 | 42 |
| dTc | / | 6 | -8 | -8 |
| Tlp | / | / | 31 | 32 |
| dTs | -13 | -9 | -10 | -9 |

※ UNIT OF dTtop, Ttop, dTc, Tlp, dTs ARE 1/32T

| Pw | 14.0 mW |
|----|---------|
| Pm | 9.22 mW |
| Ps | 3.80 mW |
| Pc | 0.20 mW |

| Mark | 2T | 3T | 4T | ≧5T |
|------|----|----|----|-----|
| dTtop | -18 | -13 | -10 | -10 |
| Ttop | 50 | 48 | 38 | 40 |
| dTc | / | 3 | -9 | -9 |
| Tlp | / | / | 30 | 31 |
| dTs | -15 | -10 | -11 | -7 |

※ UNIT OF dTtop, Ttop, dTc, Tlp, dTs ARE 1/32T

@S1302
【before correction】 reproduced
【after correction】 reading

@S1402

【before correction】 reproduced

【after correction】 reading

*FIG. 18A*
*FIG. 18B*
WAVEFORM OF SUPERIMPOSED
SIGNAL OF 8T PURE-TONE SIGNAL
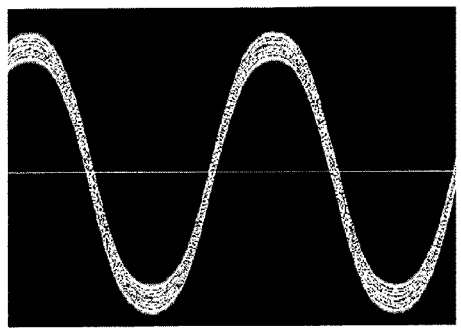
WAVEFORM OF SUPERIMPOSED
SIGNAL OF 2T PURE-TONE SIGNAL
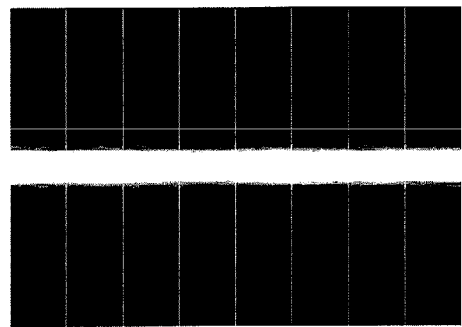

FIG. 23

| HEADER INFORMATION | |
|---|---|
| INHERENT INFORMATION | DISC INFORMATION |
| | RECORDING SPEED INFORMATION |
| | EDGE FLUCTUATION AMOUNT INFORMATION |
| | REPRODUCING LIGHT ACCELERATION CONDITION |
| | ... |
| RECORDING POWER INFORMATION | Pw, Pm, Ps, Pc SETTING INFORMATION |
| RECORDING PULSE INFORMATION | dTtop SETTING INFORMATION |
| | Ttop SETTING INFORMATION |
| | dTc SETTING INFORMATION |
| | Tlp SETTING INFORMATION |
| | dTs SETTING INFORMATION |
| | ... |
| FEATHER INFORMATION | |

@Inherent information

【before correction】 reproducing light

【after correction】 reading light

FIG. 24

| OPTICAL DISC | EDGE FLUCTUATION AMOUNT | LIFE SPAN |
|---|---|---|
| 1 | $4.3 \times 10^{-4}$ | 17 YEARS |
| 2 | $2.1 \times 10^{-4}$ | 63 YEARS |
| 3 | $2.0 \times 10^{-4}$ | 66 YEARS |
| 4 | $1.9 \times 10^{-4}$ | 69 YEARS |
| 5 | $2.8 \times 10^{-4}$ | 51 YEARS |
| 6 | $2.3 \times 10^{-4}$ | 55 YEARS |
| 7 | $2.0 \times 10^{-4}$ | 66 YEARS |
| 8 | $1.8 \times 10^{-4}$ | 72 YEARS |
| 9 | $3.1 \times 10^{-4}$ | 43 YEARS |
| 10 | $2.0 \times 10^{-4}$ | 66 YEARS |

INFORMATION RECORDING METHOD, INFORMATION RECORDING APPARATUS, INFORMATION RECORDING MEDIUM, AND MEDIUM ESTIMATING METHOD

CLAIM OF PRIORITY

The present application claims priority from Japanese Patent Application JP 2012-161129, filed Jul. 20, 2012, the content of which is hereby incorporated by reference into this application.

BACKGROUND OF THE INVENTION

1. Field of the Invention

The present invention relates to an information recording method which determines a recording waveform of a light beam at a time of recording information by irradiating light to an optical disc and records the information using the light beam, an information recording apparatus which records information on an optical information recording medium, an information recording medium and a medium evaluating method.

2. Background Art

Currently, as an optical disc that is an optical information recording medium, a CD (Compact Disc), a DVD (Digital Versatile Disc), a BD (Blu-ray Disc), a BDXL™, and the like have been commercialized and widely spread in use. These optical discs include various kinds of discs such as a ROM (Read Only Memory) type which is dedicated for reproduction, a R (Recordable) type which is a re-recordable type, a RE (Rewritable) type which is a rewritable type.

A laser beam is irradiated to the optical disc to perform information recording and reading on the optical disc. An area is formed in which a state of a recording film material is changed by heat of the laser beam, whereby information recording is performed. An area where the state is changed is referred to as a mark, and another area where the state is not changed is referred to as a space. As the recording film, a phase-change material, an organic dye, and an alloy and an oxide of inorganic material are used. A mark edge recording is used as an encoding method in the CD, the DVD, the BD, and the BDXL™, and information is recoded as an edge position of a mark.

In the recording, it is necessary to control the heat that is generated by irradiation of a laser beam so as to form a mark of any length in the recording film. Therefore, the laser beam at a time of recording is controlled in various waveforms depending on a mark length to be formed. FIGS. 1A and 1B are examples of laser emitting waveforms to be used when marks of 2T to 5T (T is a channel bit length) are formed. These are recording waveforms to be used in BDXL™ specification, FIG. 1A is referred to as an N-1 strategy, and FIG. 1B is referred to as a castle strategy. In the N-1 strategy, a mark of a length of NT is recorded using (N-1) pulses. The first pulse in a pulse train is referred to as a first pulse, and the last pulse in the pulse train is referred to as a last pulse. The pulse between the first pulse and the last pulse is referred to as a multi-pulse. In a case of 4T mark, the number of the multi-pulse is one. The number of the multi-pulse is increased by one, as the subsequent mark length is increased by 1T. A pulse of 2T mark has only the first pulse. A pulse of 3T mark has only the first pulse and the last pulse. Both the pulses of 2T mark and 3T mark do not respectively include the multi-pulse. On the other hand, in the castle strategy, each waveform is mainly configured of either only first pulse or both of the first pulse and the last pulse without the multi-pulse, and the waveform between the first pulse and the last pulse is kept at a constant power. Since a pulse having a short width is not used in the waveform, the waveform is suitable for recording at high speed.

With respect to a laser beam power in each strategy, the N-1 strategy uses four kinds of powers, that is, a recording power (Pw), a space power (Ps), a bias power (PBW), and a cooling power (Pc), whereas the castle strategy uses four kinds of powers, that is, an intermediate power (Pm), in addition to the Pw, the Ps, and the Pc. Here, in the RE type optical disc, the Ps is referred to as an erase power (Pe). The Pw has a maximum power level in a pulse train, and is used to mainly cause a state change by inputting energy to the recording film. The Ps is the power level to be irradiated to a part that becomes a space, and is used mainly in preheating to form a next mark. The Pe in the RE type optical disc plays a role to return the mark that is already recorded to a space, in addition to the preheating. The Pc is the power level right after the last pulse, and mainly plays a role to block heat diffusion to the subsequent mark recording part in the R type optical disc, and a role to rapidly cool the recording film in order to form the mark in the RE type optical disc.

Although the recording of the optical disc is performed using the aforementioned recording waveforms, the recording waveforms are different depending on the type of the optical disc and the recording layer. This is resulted from that the material of the recording film and the formation mechanism of a mark are different. Therefore, the recording waveform is prepared for each type of the optical disc and recording layer. As indexes for defining the recording waveform, there are dTtop, Ttop, TMP, dTLP, TLP, dTc, dTS, and dTE for defining the pulse width, and the like, in addition to the aforementioned various power levels Pw, Pm, Ps, Pe, Pc, and PBW. The dTtop indicates the start end position of the first pulse, the Ttop indicates the time width of first pulse, the TMP indicates the time width of the multi-pulse, the dTLP indicates the start end position of the last pulse, the TLP indicates the time width of the last pulse, the dTS indicates the start position of the Ps, and the dTE indicates the start position of the Pe. These parameters are set in 1/16 unit of the channel bit according to the BD specification, and are set in 1/32 unit of the channel bit according to BDXL™ specification.

The recording waveform in each optical disc and the recording layer is mainly prepared by an optical disc maker, and the determined recording waveform is converted into the index of the recording waveform and is recorded in the management region of the optical disc. Accordingly, in a case of recording information on the optical disc using a drive that is an optical information recording and reading apparatus, the drive obtains the recording waveform of the optical disc from management information on the optical disc, and thus starts the recording without adjustment of the recording waveform. Here, even in the same type of optical disc, there may be a difference in an optimum recording waveform for each optical disc, especially, in a power level of a laser due to variations in production. Further, even in a case of using the same optical disc, the optimum recording may not be performed in the same recording waveform, especially in the power level of the same laser, due to the individual differences of drives. In order to correspond to the individual differences of the optical discs and the drives, the drive has means for adjusting the recording waveform. As one of adjustment methods, there is a method to optimize the laser power level called OPC (Optimum Power Control). This enables to realize a proper recording without being affected by the individual differences of the optical discs and the drives.

The adjustment of the recording waveform in the aforementioned optical disc maker and the drive is performed by evaluating the quality of the recording signal in each recording waveform. As evaluation indexes of the recording signal, there are a Jitter of evaluating the aged fluctuation in the mark edge, bER (bit Error Rate) of evaluating the decoded result of a reading signal, SER (Symbol Error Rate), and the like. Further, as an index of evaluating the reading signal quality based on PRML to be used in reading signal processing of BDLX™, i-MLSE (Integrated-Maximum Likelihood Sequence Error Evaluation) is disclosed in Pamphlet of International Publication WO2010-001588. i-MLSE is an index of statistically evaluating an error amount of a target waveform and a reading signal waveform that are predicted at a time of decoding. Besides this, SbER (Simulated bit Error Rate) is disclosed in JP-A-2004-253114. SbER is an index of quantifying an estimation value of an error probability from an error amount of the target waveform and the reading signal waveform. Furthermore, L-SEAT (run-length-Limited Sequence Error for Adaptive Target) which is an index of evaluating a shift of an edge position of a recording mark is disclosed in US 2010-0260025. L-SEAT is a value that is obtained by calculating the error amount of the reading signal waveform and Left target waveform and Right target waveform that are assumed in a case where the edge is shifted in the left or right with respect to the target waveform, before and after each edge of each mark length. Since the shift amount of the mark edge can be evaluated using L-SEAT, L-SEAT is suggested as an adjustment index of the recording waveform in BDXL™ specification.

SUMMARY OF THE INVENTION

Here, a signal recorded on the optical disc is agedly deteriorated. For this reason, it is necessary to adjust a recording waveform in order to suppress the deterioration in a recording signal on an optical disc. In order to confirm a difference in signal deterioration characteristics depending on the recording waveform, in the optical disc of BDXL™ specification, two types of recording signal are prepared such that their i-MLSE are equivalent to each other immediately after the recording. The recording signals are prepared based on the castle strategy in FIG. 1B, and the parameter values thereof are illustrated in FIGS. 2A and 2B. The main difference between recording signal A (Write strategy-A: WS-A) and the recording signal (WS-B) is signal modulation. The signal modulation for A and B is 50% and 60%, respectively. FIG. 3 shows a result of measuring the deterioration characteristic after a thermostatic oven acceleration test is performed with respect to the signal recorded using the recording waveform. The thermostatic oven acceleration test is a testing which utilizes aggravated condition of heat, humidity, etc. to speed up the normal aging processes of the optical disc. agedFrom FIG. 3, it is found that immediately after the recording, i-MLSE in two recording signals are almost same, but the deterioration rate of the recording signal A is faster than that of the recording waveform B. Due to the fact, it found difficult to determine the optimal recording signal enabling to suppress the deterioration of the optical disc for the long term storage by using i-MLSE. It is resulted from that i-MLSE is not an index reflecting the deterioration characteristic of the signal. In addition, since indices such as L-SEAT, SbER, bER, SER, and Jitter cannotreflect the deterioration characteristic it is apparent that it is not possible to determine the recording waveform which suppresses the deterioration of the recording signal by adjusting the recording waveform based on the indices. From the above, in a case of using the adjustment index of the recording waveform in the related art, it is difficult to determine the recording waveform which suppresses the deterioration of the recording signal.

Therefore, in an agedaged deterioration of a recording signal, the adjustment of the recording waveform is performed based on the fluctuation amount of the mark edge position, focused on that the fluctuation of the mark edge position is increased. Specifically, the recording waveform is adjusted such that the fluctuation amount becomes minimum or a threshold value or less.

Hereinafter, indexes reflecting deterioration characteristics of an optical disc are described.

In order to describe deterioration cause of the optical disc, a thermostatic oven acceleration test is performed, and the change in the recording mark size, the movement (shift) of the average position of the mark edge, and the fluctuation of the mark edge position according to the agedaged deterioration are measured. The result is illustrated in FIG. 4. In FIG. 4, β is an index of evaluating a ratio of the mark length of a short mark and that of a long mark. Further, L-SEAT shift and L-SEAT jitter are indexes disclosed in US2010/0260025, and respectively represent indexes for evaluating the shift and the fluctuation of the mark edge position. Here, since L-SEAT is an index that is directly calculated from the reading signal, it is necessary to notice that the L-SEAT is an index which is affected by the noise of the reading system. When comparing the increase amount Δ of each evaluation index before and after the acceleration test, it is possible to confirm that the L-SEAT shift does not change and the increase of β is small, whereas the L-SEAT jitter is remarkably increased. From this fact, it is possible to confirm that the fluctuation amount of the mark edge position is increased, in the aged deterioration of the recording signal.

Therefore, using simulation, the effect of fluctuation in the mark edge position affecting the reading signal quality is considered. For the purpose of comparison, calculation even for a case where the mark length is uniformly increased in the entire mark length is performed. Since the uniform increase in the mark length results in a change in a ratio of the mark length of a short mark and the mark length of a long mark, this corresponds to a change of β. The result of calculating a relationship between the fluctuation amount of the mark edge position and i-MLSE is illustrated in FIG. 5A, and the result of calculating a relationship between the increase amount of the mark length and i-MLSE is illustrated in FIG. 5B. Since i-MLSE is rapidly increased according to the increase in the fluctuation amount of the mark edge position, it is possible to confirm that the fluctuation in the mark edge position remarkably deteriorates the signal quality (FIG. 5A). On the other hand, since i-MLSE rarely changes according to the increase in the mark length, it is found that the contribution of β change due to the deterioration in the signal quality is small (FIG. 5B). From the above result, it is found that the agedaged deterioration in the recording signal quality is due to an increase in the fluctuation in the mark edge position. From the above fact, it is found that the recording waveform is adjusted such that the fluctuation amount of the mark edge position becomes small, thus it is possible to suppress the deterioration in the recording signal.

Here, although L-SEAT Jitter is used in a method of evaluating the fluctuation amount of the mark edge position, since the L-SEAT Jitter is affected from various noises of a readingreading system, the L-SEAT Jitter is not an index of correctly reflecting the fluctuation amount of the mark edge position. Therefore, an index capable of evaluating the fluctuation amount of the mark edge position, without being affected by various noises of the reading system has been proposed. Hereinafter, a description of the proposed evaluation index will be given. FIG. 6 is a schematic diagram illustrating a change in a signal level in a case where the position of the mark edge is moved. Since the change in the signal level in the mark edge (step response) is substantially linear, it is known that the change amount of the signal level is proportional to the move amount of the mark edge position and the maximum amplitude of the step response in a case where the mark edge position is moved. That is, it is found that a value, in which the change amount of the signal level derived from the movement of the mark edge position is normalized by the maximum amplitude of the recording signal, represents the move amount of the mark edge position without depending on a reflectance, a modulation degree of a signal, and a reading system. Using this characteristic, the fluctuation amount of the mark edge position is to be evaluated by an index in which the fluctuation amount of the signal level derived from the fluctuation of the mark edge position is normalized by the maximum amplitude of the step response. Since it is confirmed that the proposed evaluation index is not affected by the reading system, the evaluation indexes variation of several-alreading powers are measured, and the result of the measurement is illustrated in FIG. 7. In this measurement, the same signal is used for this measurement Since the proposed evaluation index has a constant value irrespective of that SNR (Signal to Noise Ratio) of the reading signal changes according to the change in the reading power, it is possible to confirm that the evaluation index accurately reflects the fluctuation amount of the mark edge position, without being affected from the reading system.

From the above result, the recording waveform which suppresses the deterioration in the recording signal can be determined by evaluating the fluctuation amount of the mark edge position and adjusting the recording waveform such that the evaluation index becomes small, using the aforementioned evaluation index.

Here, the calculation of the evaluation index of the fluctuation amount of the mark edge position is not limited to the description above. For example, if the difference of the fluctuation amount of the mark edge position depending on the recording waveform in the same medium is compared, the signal amplitude used in normalization is not limited to the maximum amplitude of the step response, but the signal amplitude may be the signal amplitude of the same signal length in each recording waveform. Further, if the fluctuation amount of the mark edge position between different mark lengths is compared, the index in which the aforementioned evaluation index is multiplied by the measured signal length may be calculated. Further, in a case of calculating the evaluation index of the fluctuation amount of the mark edge position using the fluctuation amount of the time direction derived from the fluctuation of the mark edge position, the fluctuation amount of the time direction may be normalized with the maximum amplitude of the step response. As described above, there are many variations in the evaluation index of the fluctuation amount of the mark edge position depending on the purpose. Therefore, hereinafter, an index of evaluating the fluctuation amount of the mark edge position is integrally referred to as an edge fluctuation amount. The edge fluctuation amount is an index of quantifying the fluctuation amount of the mark edge position, and indicating an index used in quality determination of the recording waveform in the determination of the recording waveform which suppresses the deterioration of the recording signal. Further, hereinafter, the fluctuation amount of the signal level derived from the fluctuation of the mark edge position that is used in the calculation of the edge fluctuation amount is a level fluctuation amount, and the fluctuation amount of the time direction derived from the fluctuation of the mark edge position is referred to as a time fluctuation amount.

By an adjustment method of a recording waveform of the present invention based on an edge fluctuation amount, the recording waveform which suppresses an aged deterioration of the recording signal can be determined and the extension of the life span of the recording signal is realized.

BRIEF DESCRIPTION OF THE DRAWINGS

FIG. 2A is an exemplary diagram illustrating index values of determining a waveform structure of a recording waveform A, and FIG. 2B is an exemplary diagram illustrating index values of determining a waveform structure of a recording waveform B, based on the castle strategy.

FIG. 11A is an exemplary diagram illustrating index values of determining a waveform structure of a recording waveform E, and FIG. 11B is an exemplary diagram illustrating index values of determining a waveform structure of a recording waveform F.

FIG. 18A is an exemplary diagram illustrating a superimposed signal generated from a reading signal of a single periodic pattern of a 8T signal, and FIG. 18B is an exemplary diagram illustrating a superimposed signal generated from a reading signal of a single periodic pattern of a 2T signal.

FIG. 23 is an exemplary diagram illustrating information that is included in DI (Disc Information) of the optical disc relating to an embodiment of the present invention.

FIG. 24 is an exemplary diagram illustrating a result of calculating an edge fluctuation amount and a life span of a recording signal of each of optical discs 1 to 10.

DESCRIPTION OF EMBODIMENTS

Hereinafter, a description of a determination method of a recording waveform as an embodiment of the present invention will be made using the accompanying drawings.

Embodiment 1

Figure 8:
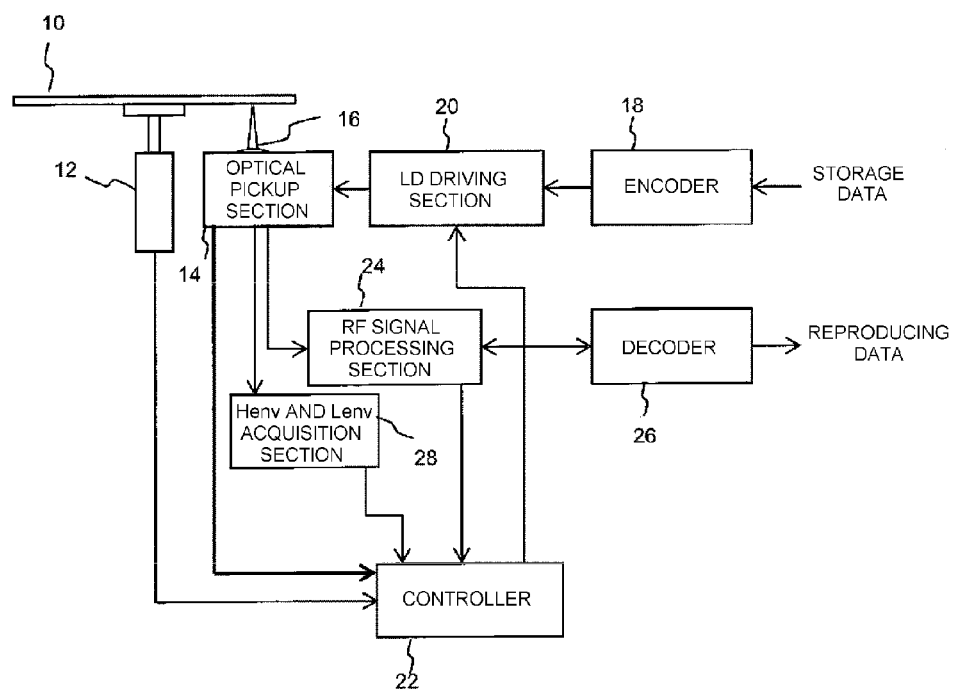
FIG. 8 is an exemplary block diagram illustrating a main configuration of an optical disc apparatus relating to an embodiment of the present invention.

Prior to describing a method of determining a recording waveform, firstly, an optical disc apparatus relating to the present embodiment will be described. FIG. 8 illustrates a configuration of the optical disc apparatus that is used in the present invention. As a main configuration, the optical disc apparatus includes a spindle motor 12, an optical pickup section 14, an encoder 18, a LD driving section 20, a controller 22, a RF signal processing section 24, a decoder 26, and a Henv and Lenv acquisition section 28. The spindle motor 12 controls the optical disc 10 in a CLV (Constant Linear Velocity) or a CAV (Constant Angular Velocity). The optical pickup section 14 is provided opposing to the optical disc 10, records a signal on the optical disc 10 by emitting laser light 16 of recording power from the laser diode (LD), and reads the recorded signal by emitting laser light 16 of reading power from the LD. Further, in a case where the optical disc 10 is rewritable, the optical pickup section 14 erases the recorded signal by emitting laser light 16 of erasing power (reading power< erasing power<recording power) from the LD.

In a case of recording a signal, a recording signal is encoded in the encoder 18 and is supplied to the LD driving section 20. The LD driving section 20 determines a driving signal based on the encoded recording waveform, and supplies the driving signal to the LD inside the optical pickup section 14 to record. The recording power value in the LD driving section 20 is determined by a control signal from the controller 22. Prior to recording the signal, the controller 22 performs a test writing in a test writing region of the optical disc 10 using several kinds of recording powers, and determines an optimum recording power based on the signal of the test writing. Further, the controller performs the test writing using several kinds of recording waveforms and determines an optimum recording waveform based on the signal of the test writing.

On the other hand, at a time of data reading, a RF signal that is output from the optical pickup section 14 is supplied to the RF signal processing section 24. The RF signal processing section 24 includes a RF amplifier or an equalizer, a section to binarize, a PLL section, and processes the RF signal to supply the processed RF signal to the decoder 26. The decoder 26 decodes the signal based on the binarized RF signal and a synchronized clock that is reproduced in the PLL section to output as reading data. The Henv and Lenv acquisition section 28 amplifies the reading signal that is output from the optical pickup section 14, and then calculates an upper envelope (Henv) and a lower envelope (Lenv) of the reading signal to supply to the controller 22 for a signal quality evaluation. Further, the reading RF signal from the RF signal processing section 24 which is a RF signal acquisition system is also amplified, and then supplied to the controller 22 for a reading signal evaluation. In addition, the RF signal from the optical pickup section 14 is also supplied to the controller 22, and is used for a noise analysis of the reading signal, and the like. Moreover, in addition to the above components, at a time of data recording and reading, there are a circuit which generates a tracking error signal and a focus error signal to control a focus servo and a tracking servo and a circuit which performs an address demodulation or a rotation number control from a wobble signal formed on the optical disc 10, but these circuits are the same as the related art, and thus the description thereof will be omitted.

Figure 9:
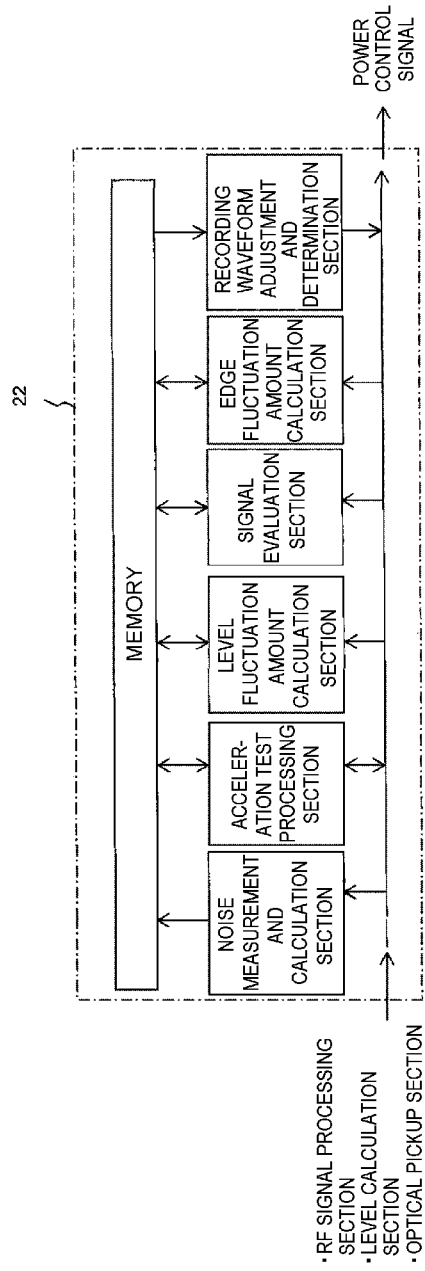
FIG. 9 is an exemplary block diagram illustrating a main configuration of a controller of the optical disc apparatus relating to the embodiment of the present invention.

The controller 22 is specifically configured of a CPU, a memory (ROM, RAM), and the like, and realizes various functions by combining them. For example, the controller 22 has a function of calculating an edge fluctuation amount from the reading signal and determining an optimum recording waveform based on the edge fluctuation amount. The functional blocks of the controller 22 in FIG. 8 is shown in FIG. 9. The controller 22 is configured of a noise measurement and calculation section, an acceleration test processing section, a level fluctuation amount calculation section, a signal evaluation section, an edge fluctuation amount calculation section, a recording waveform adjustment and determination section, and a memory. The noise measurement and calculation section performs a noise measurement of the reading signal and a separation of the noise to each component. The acceleration test processing section has a function of acquiring an acceleration test condition, a function of acquiring a test situation such as an acceleration test time, and a function of calculating various indexes (a reflectance, a modulation degree, jitter, asymmetry, β, and the like) from the reading signal, and stores the acquired information to the memory. Further, the acceleration test processing section determines the start and the end of the acceleration test and a change in the acceleration test condition based on the information that is read from the memory. Since the acceleration test conditions are different for each type (SL or DL, TL, QL, and the like) of the optical disc 10 and each linear velocity, the conditions vary depending on the type of the optical disc 10. The level fluctuation amount calculation section calculates an average level of the reading signal from the reading signals, and calculates the level fluctuation amount using various noises that are read from the memory. The signal evaluation section performs a quality evaluation of the recording signal based on the reading signal and the information that is acquired from the RF signal processing section. The edge fluctuation amount calculation section calculates the signal amplitude of the reading signal from the reading signal, and calculates an edge fluctuation amount using a level fluctuation amount that is acquired from the memory and the signal length that is used in calculating the level fluctuation amount. The recording waveform adjustment and determination section performs an adjustment of the recording waveform and a determination of the optimum recording waveform based on the edge fluctuation amount that is acquired from the memory to output as a power control signal, and supplies the signal to the LD driving section 20.

Next, a method of calculating the edge fluctuation amount of the recording signal using the aforementioned optical disc apparatus will be described. The edge fluctuation amount is calculated by measuring various noises contained in the reading signal, calculating the level fluctuation amount from the measured noise, and applying a predetermined operation to the level fluctuation amount. The noise contained in the reading signal includes a system noise ($N_{system}$), a laser noise ($N_{LD}$), a disc noise ($N_{Disc}$), a level fluctuation amount ($N_{fluc}$) derived from the fluctuation of the mark edge position. These various noises are measured and separated in the noise measurement and calculation section in the controller 22.

The system noise is generated in an electrical circuit in the optical disc apparatus when there is no optical input to OEIC. The system noise is measured when the circuit is activated while no disc is inserted. The measured system noise is stored in the memory in the controller 22.

The laser noise and the disc noise are calculated using the noise ($N_{total-1}$) by the operation of the expression 1 below in a case where the unrecorded part of the optical disc is reproduced.

$$N_{LD+Disc} = \sqrt{(N^2_{total-1} - N^2_{system})} \quad \text{Expression 1}$$

Here, the laser noise and the disc noise are acquired as a sum value ($N_{LD+Disc}$), and the acquired value is associated with the average level of the reading signal and stored in the memory in the controller 22.

Subsequently, the measurement and calculation of the level fluctuation amount is performed, but it is necessary to record the predetermined signal using a recording waveform of interest in this case. In a case of setting several kinds of recording waveforms in determination of the recording waveform, for example, the optimum recording waveform recorded in advance on the optical disc is read or the optimum recording waveform in the optical disc that is stored in the optical disc apparatus is read, and then several kinds of recording waveforms are set based on the optimum recording waveform. Using the several kinds of recording waveforms that are set, a predetermined signal is recorded in the predetermined region, for example, the test recording region of the optical disc. The predetermined signal is a pattern for measuring the edge fluctuation amount, for example, a single periodic pattern of a 8T signal. The signal length of the single periodic pattern may be about a thousand times of repetitions (about ten thousand T) of the signal to be recorded, but the sample number is increased as the signal length is enlarged to one million T, thereby correctly measuring the edge fluctuation amount. Here, in a case of confirming the signal quality in the recording waveforms, the pattern for measuring the signal quality, for example, a random pattern, is also recorded as a predetermined signal. The signal length of the random pattern depends on the index of the signal quality to be measured. For instance, if bER is measured at an accuracy of $1 \times 10^{-6}$, the signal length of about one million T is needed, whereas if SER is measured, the signal length of one cluster is needed. Further, in a case of measuring i-MLSE or L-SEAT, the signal length may be as short as about 100 thousand T.

The measurement and the calculation of the level fluctuation amount are performed by reading the pattern for measuring the edge fluctuation amount. Noise ($N_{total-2}$) is measured from the reading signal, and the level fluctuation amount is calculated by the operation of Expression 2 below.

$$N_{fluc} = \sqrt{(N^2_{total-2} - N^2_{system} - \alpha N^2_{LD+Disc})} \quad \text{Expression 2}$$

Here, coefficient $\alpha$ is a ratio of the reflected light amount of the recorded part and the reflected light amount of the unrecorded part of the pattern for measuring the edge fluctuation amount. The reason why the sum noise of the laser noise and the disc noise is multiplied by the coefficient $\alpha$ is that these noises are proportional to the average refection rate of the disc. Further, in a case where the signal length of the optical resolution or more is included in the pattern for measuring the edge fluctuation amount, the signal component is included in the measured noise. In this case, after the signal component is removed in advance from the measurement noise, the level fluctuation amount is calculated by the operation of Expression 2. As a removal method, for example, if the pattern for measuring the edge fluctuation amount is a single periodic pattern, and a noise is measured using a FFT function (Fast Fourier Transform), a carrier present in the signal frequency may be removed from the measured noise spectrum. The calculated level fluctuation amount is associated with the recording waveform and stored in the memory of the controller 22.

The edge fluctuation amount is calculated by the operation of Expression 3 below using the calculated level fluctuation amount.

(EDGE FLUCTUATION AMOUNT)=(LEVEL FLUCTUATION AMOUNT)/(AMPLITUDE OF PREDETERMINED MARK LENGTH)     Expression 3

Figure 6:
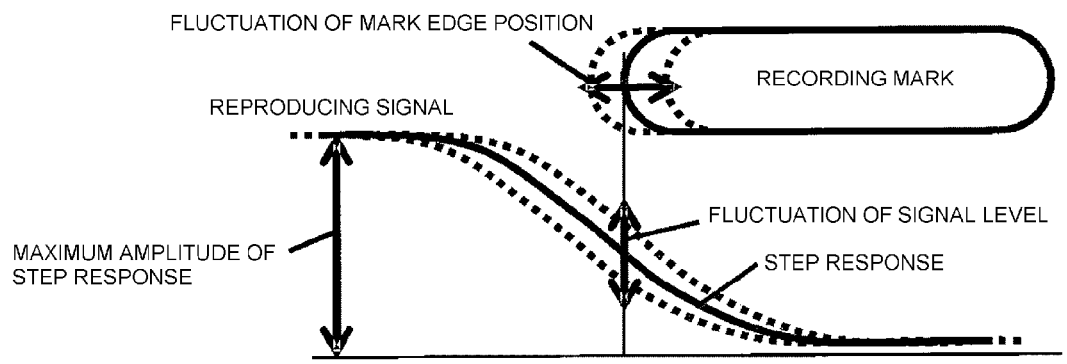
FIG. 6 is a schematic diagram illustrating a relationship between a fluctuation of a mark edge value and a fluctuation of a signal level.
Figure 7:
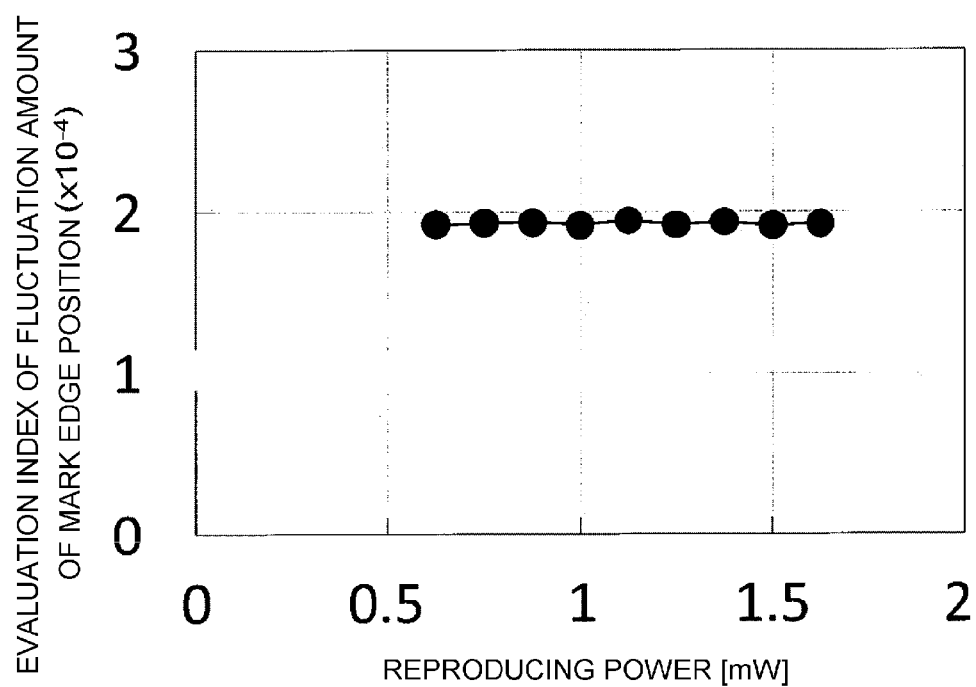
FIG. 7 is an exemplary diagram illustrating a relationship between an evaluation index of the fluctuation amount of the mark edge position and reading power used for measuring.

Here, based on the principal of FIG. 6, the amplitude of a predetermined mark length is the maximum amplitude of the step response of the recording signal, but if the signal amplitude of the same signal length is used in calculating the edge fluctuation amount of each recording waveform, the edge fluctuation amount can be compared even if the amplitude of the predetermined mark length is not the maximum amplitude of the step response. For this reason, as the amplitude of the predetermined mark length, for example, the signal amplitude of the random pattern or the signal amplitude of the pattern for measuring the edge fluctuation amount is available. The calculated edge fluctuation amount is associated with the recording waveform and stored in the memory of the controller 22.

Here, the edge fluctuation amount calculated by Expression 3 varies depending on the pattern for measuring the edge fluctuation amount to be recorded even in a case where the fluctuation amounts of the mark edge positions are the same. This is caused by that the density of the mark edge in the reading signal varies. Therefore, the operation method of calculating the edge fluctuation amount without depending on the pattern for measuring the edge fluctuation amount is shown in Expression 4.

(EDGE FLUCTUATION AMOUNT)=(LEVEL FLUCTUATION AMOUNT)×(SIGNAL LENGTH (T))/(AMPLITUDE OF PREDETERMINED MARK LENGTH)     Expression 4

Here, in the above operation, the signal length is the signal length (T unit) of a signal of which a level fluctuation amount is measured, and the edge fluctuation amount of Expression 3 is converted into the edge fluctuation amount per 1T signal. By this operation, even in a case where patterns for measuring the edge fluctuation amount are different in each recording waveform, the edge fluctuation amounts can be uniformly compared.

Figure 10:
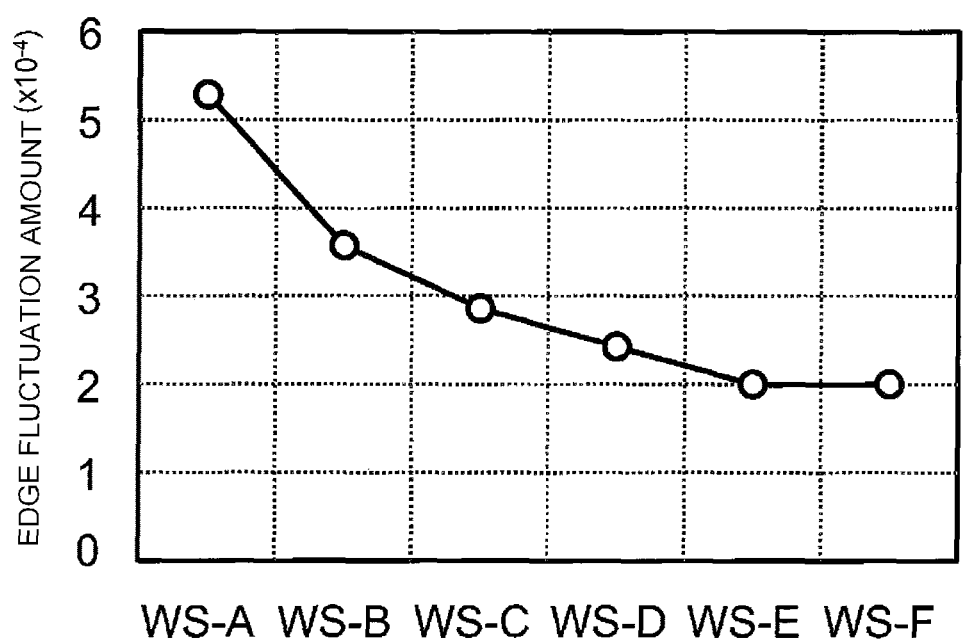
FIG. 10 is an exemplary diagram illustrating a result of measuring edge fluctuation amounts of recording signals of recording waveforms A, B, C, D, E, and F.
Figure 12:
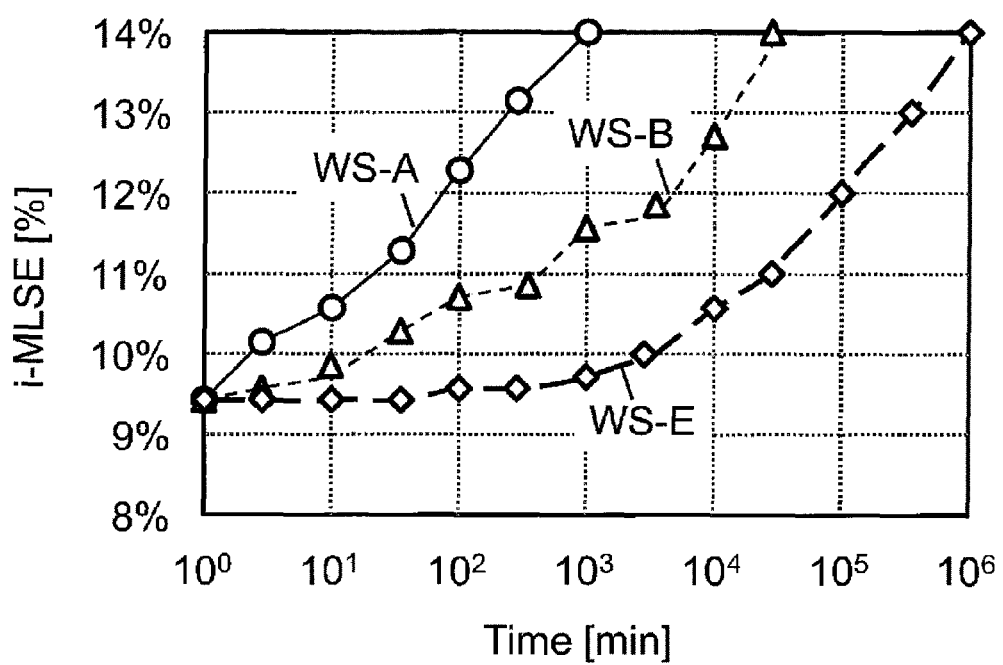
FIG. 12 is an exemplary diagram illustrating a result of measuring changes of i-MLSE due to the thermostatic oven acceleration test, in recording signals of a recording waveform A, a recording waveform B, and a recording waveform E.

Using the aforementioned optical disc apparatus and the calculation method of the edge fluctuation amount, the recording waveform which actually suppresses the deterioration of the recording signal is determined. In the present embodiment, the recording waveform in BDXL™ specification condition is adjusted using the optical disc used in FIG. 2 as the optical disc 10. The six recording waveforms A, B, C, D, E and F are prepared as a recording waveform. These waveforms are the recording waveforms in which signal modulation of the recording signals are mainly different, and which are adjusted on the basis of the recording waveform A of the optical disc that the optical disc apparatus holds. The test writing using each recording waveform is performed in the test writing region of the optical disc. The signal recorded in the test writing is a random pattern for measuring the signal quality, and the single periodic pattern of 8T signal for measuring the edge fluctuation amount. The edge fluctuation amount is calculated based on Expression 3, and the signal amplitude of 8T signal is used as "amplitude of the predetermined mark length" to be used for normalization in Expression 3. The result of the measurement of the edge fluctuation amount in each recording waveform is shown in FIG. 10. It is found that the edge fluctuation amount is decreased according to the change of the recording waveforms A, B, C, and D, and the change of the edge fluctuation amount is not found in the recording waveform D and the recording waveform F. Accordingly, the optimum recording waveform in the optical disc is determined as the recording waveform E. The parameter values of the recording waveform E and the recording waveform F are shown in FIGS. 11A and 11B. In order to confirm that the aged deterioration of the recorded signal in the determined recording waveform is suppressed, the thermostatic oven acceleration test is performed on the recording waveform E similar to FIG. 3. For comparison of the deterioration characteristic, the result with respect to the recording waveforms A and B of FIG. 2 is shown in FIG. 12. Here, since the acceleration test temperature in the acceleration test is set to be higher than the case of FIG. 3, the deterioration of the recording signal is reproduced in a short time. The recording signal of the recording waveform E is slower than the recording signal of the recording waveform B in the deterioration speed, so that it is found that the recording waveform which suppresses the aged deterioration can be properly determined by the determination method of the recording waveform. If the life span (a time when i-MLSE reaches 14%) is calculated in the standard storage condition (temperature 25° C./relative humidity 60%) using the result of the present acceleration test, the recording waveform A is calculated as about 10 years, the recording waveform B is calculated as about 24 years, and the recording waveform E is calculated as about 66 years. Form the above, it is found that the life of the recording signal can be extended using the determination method of the present recording waveform. From the above result, it is found that the recording waveform which suppresses the aged deterioration of the recording signal can be determined by measuring the edge fluctuation amount of the recording signal and adjusting the recording waveform such that the edge fluctuation amount becomes small.

Figure 13:
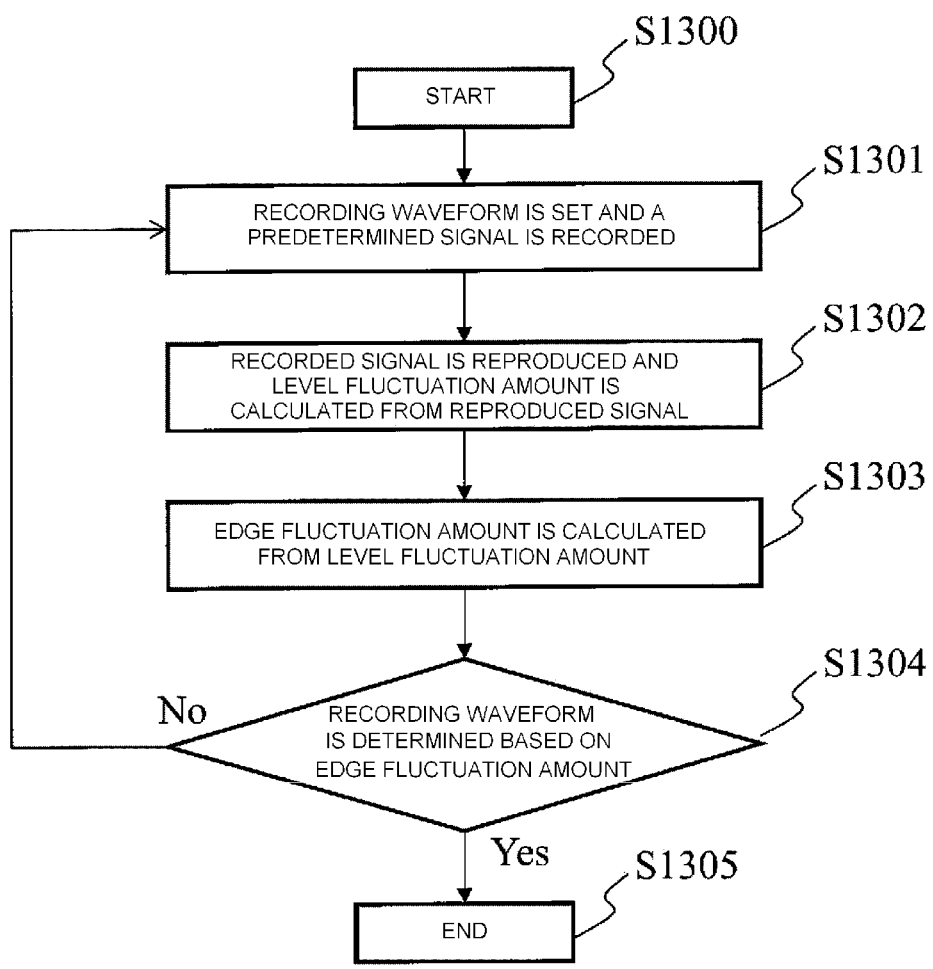
FIG. 13 is an exemplary flowchart illustrating steps of a method of determining a recording waveform which suppresses deterioration of the recording signal.

The main configuration of the determination method of the aforementioned recording waveform is arranged in FIG. 13. In step S1301 of FIG. 13, the recording waveform to be evaluated is set and a predetermined signal pattern is recorded in a predetermined region of the optical disc. In a case of determining the recording waveform by a single adjustment, several kinds of recording waveforms are prepared at a time of step S1301, a predetermined signal pattern may be recorded with respect to each recording waveform. On the other hand, in a case where the adjustment of the recording waveform is repeated to search for the optimum recording waveform, a predetermined signal pattern may be recorded with respect to one recording waveform in step S1301. In step S1302, the recorded signal is reproduced and the level fluctuation amount is calculated from the reproduced signal. Subsequently, in step S1303, the edge fluctuation amount is calculated using the calculated level fluctuation amount. At this time, the edge fluctuation amount in the recording waveform is calculated. In step S1304, the recording waveform that is used in recording is determined based on the calculated edge fluctuation amount. In a case where the recording waveform is determined by a single adjustment, since several kinds of recording waveforms are prepared in step S1301, compared with the edge fluctuation amount of each recording waveform, the recording waveform of which the edge fluctuation amount becomes minimum is determined as the optimum recording waveform, and then the determination of the recording waveform is ended (S1305). On the other hand, in a case where the adjustment of the recording waveform is repeated to search for the optimum recording waveform, the process proceeds to step S1301 from step S1304 at least once, and the edge fluctuation amount is calculated again in the waveform different from the above. In step S1304, the edge fluctuation amount of the recording waveform and the edge fluctuation amount of the one-time previous recording waveform are compared, and the adjustment is repeated until the edge fluctuation amount of the recording waveform becomes appropriate. In this case, at a time when the edge fluctuation amount of the recording waveform becomes appropriate, the determination of the recording waveform is ended (S1305). Further, in a case where the threshold value of the edge fluctuation amount is determined in advance, even if the number of the recording waveform that is set in step S1301 is one, in a case where the edge fluctuation amount of the recording waveform is the threshold value or less in step S1304, the determination of the recording waveform is ended (S1305). The above sequence is a main configuration of the determination method of the recording waveform of the present invention.

According to the sequence of FIG. 13, the determination of the recording waveform is actually performed. With respect to the aforementioned optical disc as a target, the aforementioned recording waveforms A, B, C, D, E, and F are set as the recording waveform. As a result, it is confirmed that the recording waveforms E and F are determined as the optimum recording waveform similar to the aforementioned result, and the determination of the recording waveform is properly performed.

Figure 14:
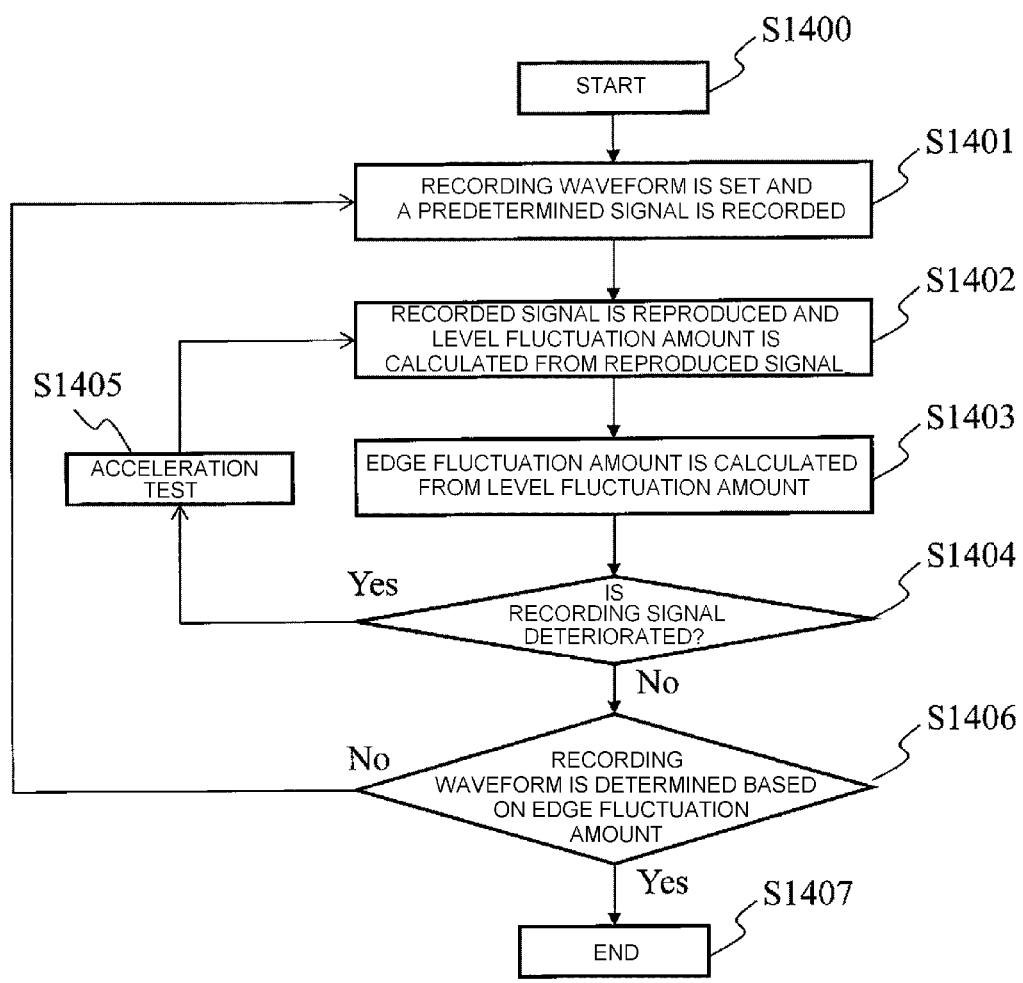
FIG. 14 is an exemplary flowchart illustrating steps in a case of introducing an acceleration test to a method of determining a recording waveform which suppresses deterioration of the recording signal.

Here, in order to improve the determination method of the recording waveform which suppresses the deterioration of the recording signal, a sequence in which an acceleration test is added to FIG. 13 is shown in FIG. 14. In the sequence of FIG. 14, after the calculation of the edge fluctuation amount (S1403), the process enters the determination of whether or not the recording signal is caused to deteriorate (S1404), and in a case where the signal is caused to deteriorate, the acceleration test is performed (S1405). Accordingly, it is not possible to measure the edge fluctuation amount immediately after recording in the sequence of FIG. 13, but it is possible to measure and evaluate the edge fluctuation amount after the aged deterioration in the sequence of FIG. 14. In a case of determining the recording waveform using the edge fluctuation amount immediately after the aged deterioration in the sequence of FIG. 14, after the edge fluctuation amount is measured in step S1403 for the first time immediately after recording, it is determined that the recording signal is caused to deteriorate in step S1404, and the acceleration test is performed in step S1405. As a method of the acceleration test, there are the aforementioned thermostatic oven acceleration test, a reading light acceleration test, and the like. The reading light acceleration test is an acceleration method which promotes the aged deterioration of the recording signal by continuing to reproduce the recoding signal with reading power higher than normal and exposing the recording film to high temperature. In this method, since only the recording film of the optical disc is selectively heated, it is possible to apply a stress higher than the thermostatic oven acceleration test, and reproduce the aged deterioration of the recording signal in shorter time compared to the thermostatic oven acceleration test. The details are described in Embodiment 4. With respect to the recording signal that is subjected to the acceleration test in step s1405, the edge fluctuation amount is measured again in steps S1402, S1403, and S1404, and it is determined whether to continue the acceleration test in step S1404. The above acceleration test and the measurement of the edge fluctuation amount are repeated, and in a case of determining that the deterioration of the recording signal is enough, the process proceeds to step S1406 from step S1404, and the determination of the recording waveform is performed based on the edge fluctuation amount after the aged deterioration. The edge fluctuation amount as a target just varies due to the aged deterioration immediately after recording, whereby the determination method of the recording waveform is the same as step S1304 of FIG. 13. However, the evaluation may be performed by the rate of increase of the edge fluctuation amount without being limited only to the edge fluctuation amount after the aged deterioration, and the evaluation may be performed by combining the edge fluctuation amount immediately after recording, the edge fluctuation amount after the aged deterioration, and the rate of increase of the edge fluctuation amount. Here, the determination of whether the deterioration of the recording signal is enough in step S1404 is performed based on that an acceleration test time, a signal quality of a recording signal, an edge fluctuation amount, a reflectance, a modulation degree, jitter, asymmetry, and β reach the threshold value that is set in advance, or whether these increase amounts reaches the threshold value that is set in advance.

Figure 1A:
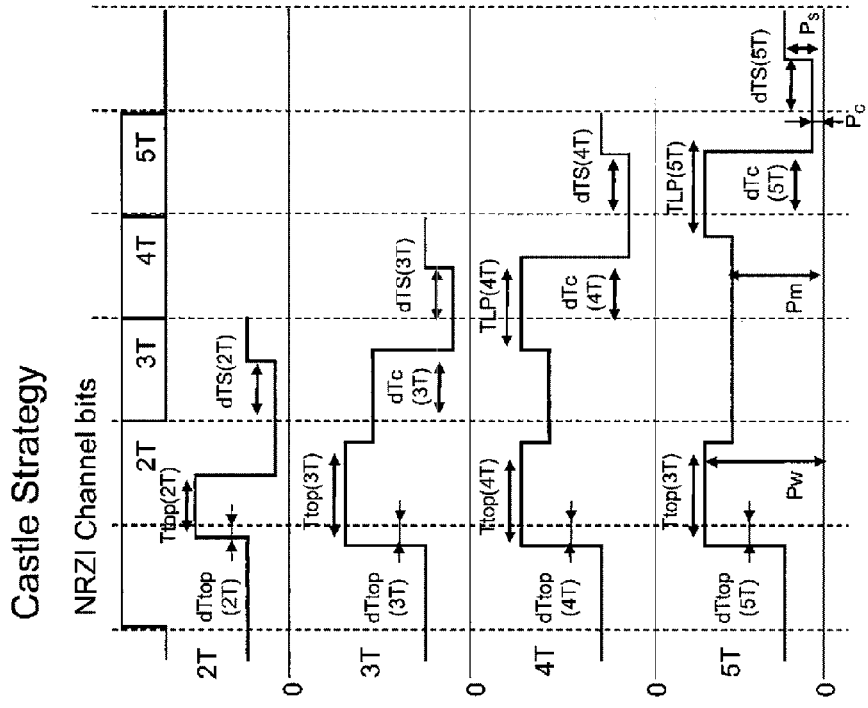
FIG. 1A is an exemplary diagram illustrating a recording waveform and definition of index of determining the recording waveform in an N-1 strategy.
Figure 1B:
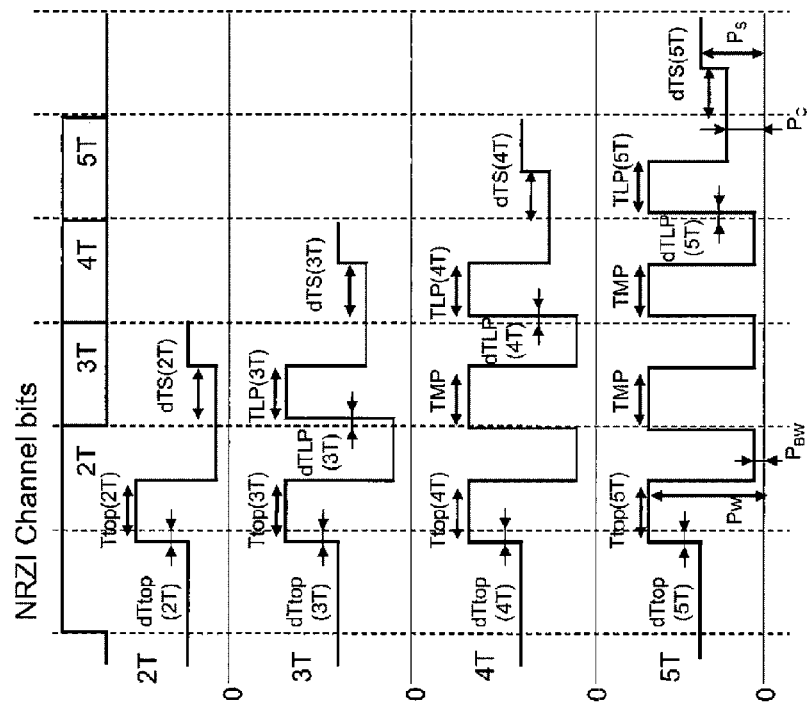
FIG. 1B is an exemplary diagram illustrating a recording waveform and definition of index of determining the recording waveform in a castle strategy.
Figure 3:
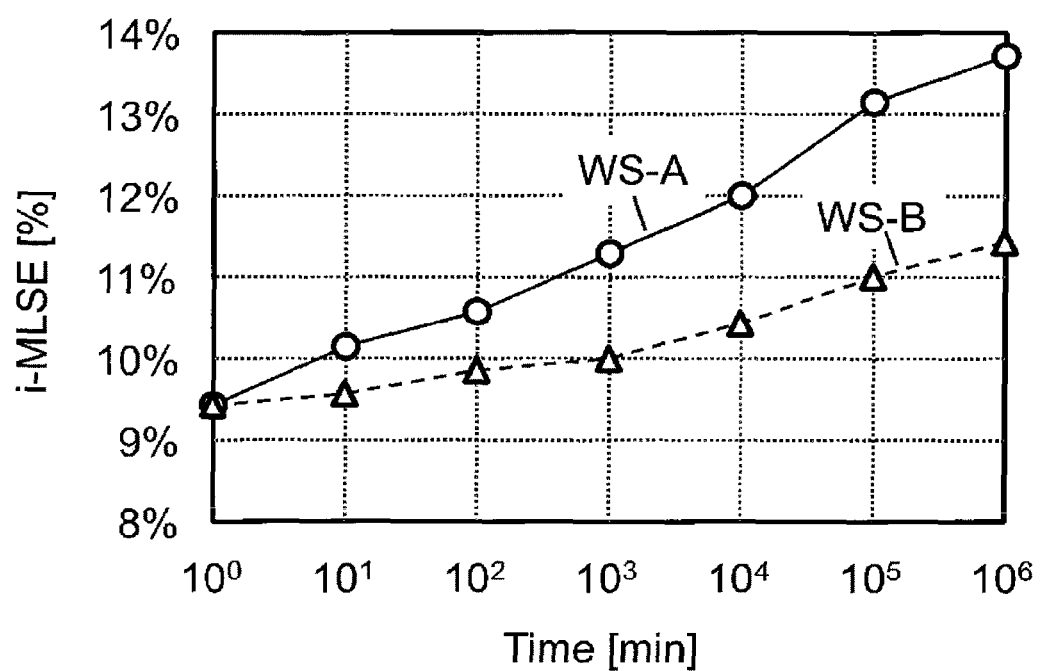
FIG. 3 is an exemplary diagram illustrating a result of measuring a change of i-MLSE due to a thermostatic oven acceleration test in the recording signal of the recording waveform A and the recording waveform B.
Figure 4:
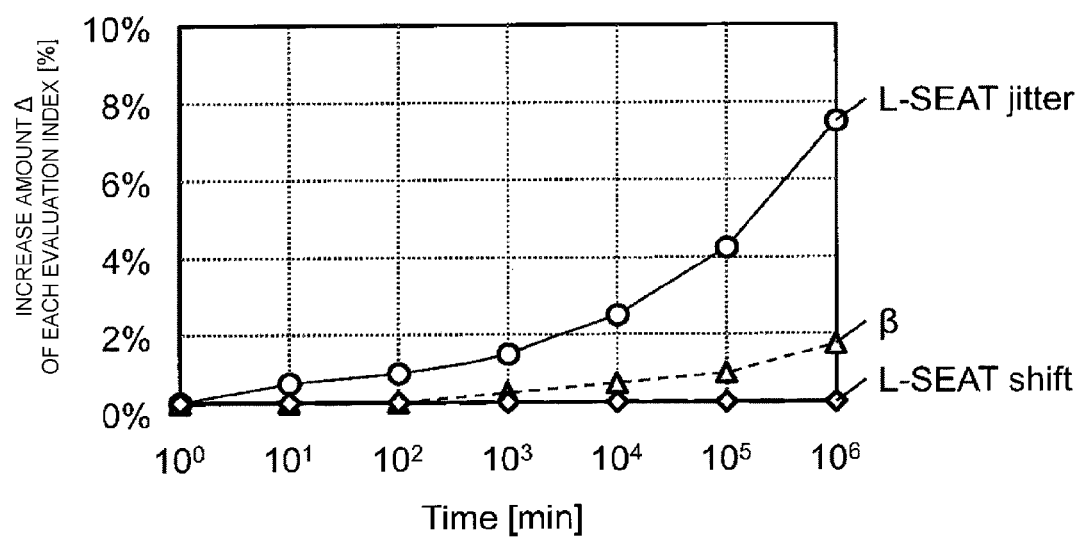
FIG. 4 is an exemplary diagram showing a result of measuring changes of L-SEAT jitter, β, L-SEAT shift jitter, and L-SEAT shift due to a thermostatic oven acceleration test.
Figure 5A:
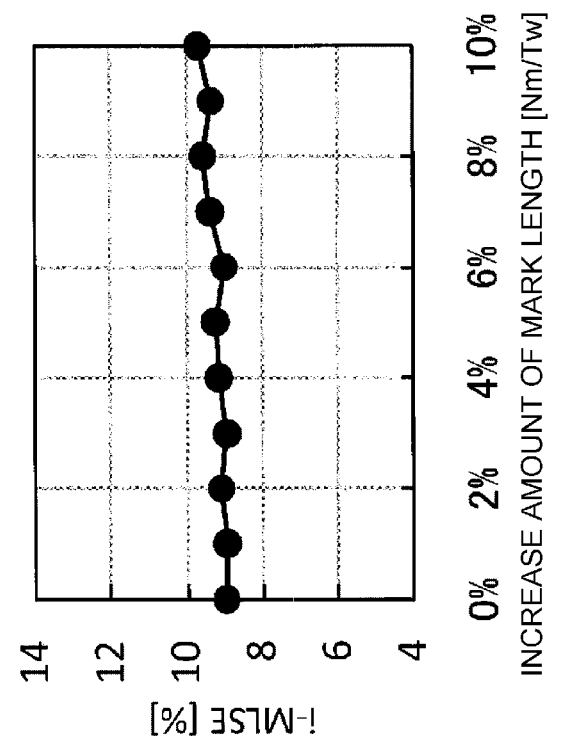
FIG. 5A is an exemplary diagram illustrating a result of calculating a relationship between fluctuation amount of a mark edge position and i-MLSE.
Figure 5B:
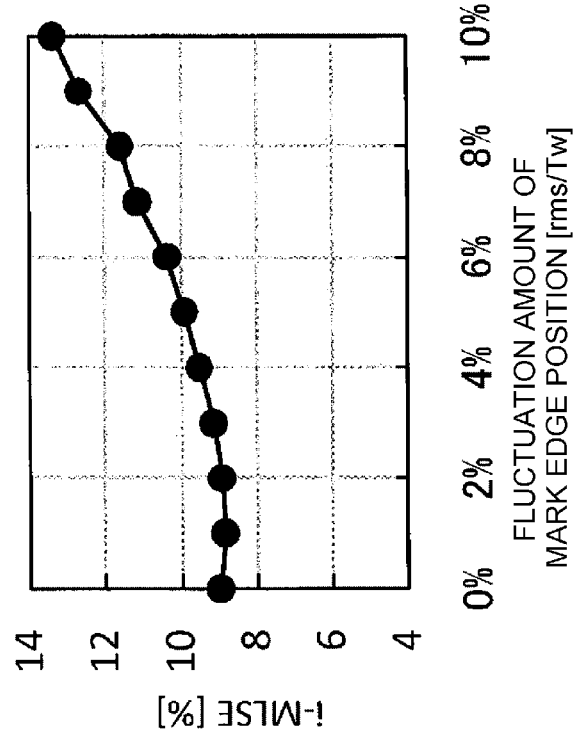
FIG. 5B is an exemplary diagram illustrating a result of calculating a relationship between an increase amount of a mark length and i-MLSE.
Figure 15:
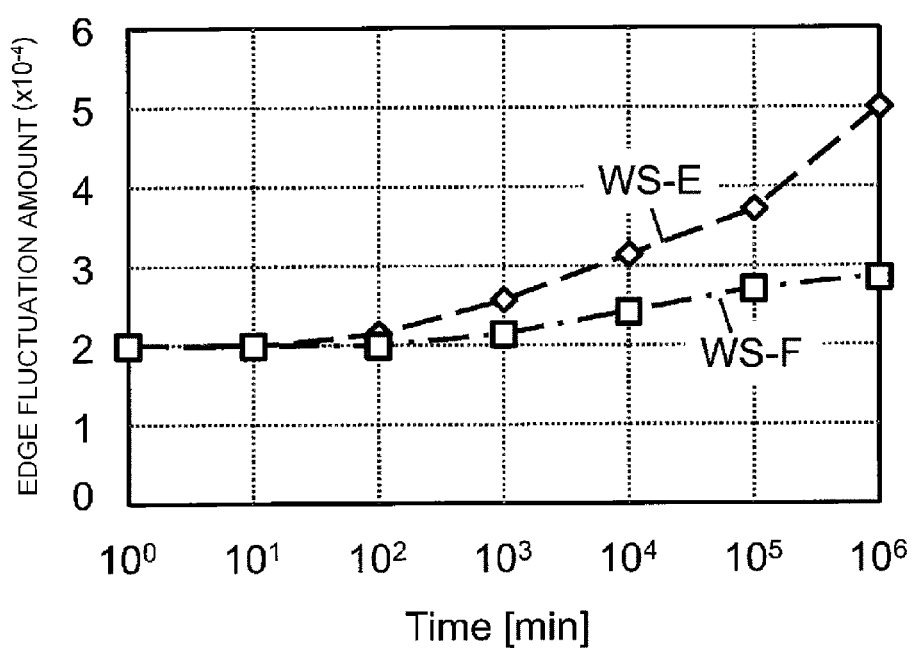
FIG. 15 is an exemplary diagram illustrating a result of measuring a change of an edge fluctuation amount due to the thermostatic oven acceleration test in the recording signal of the recording waveform E and the recording waveform F.
Figure 16:
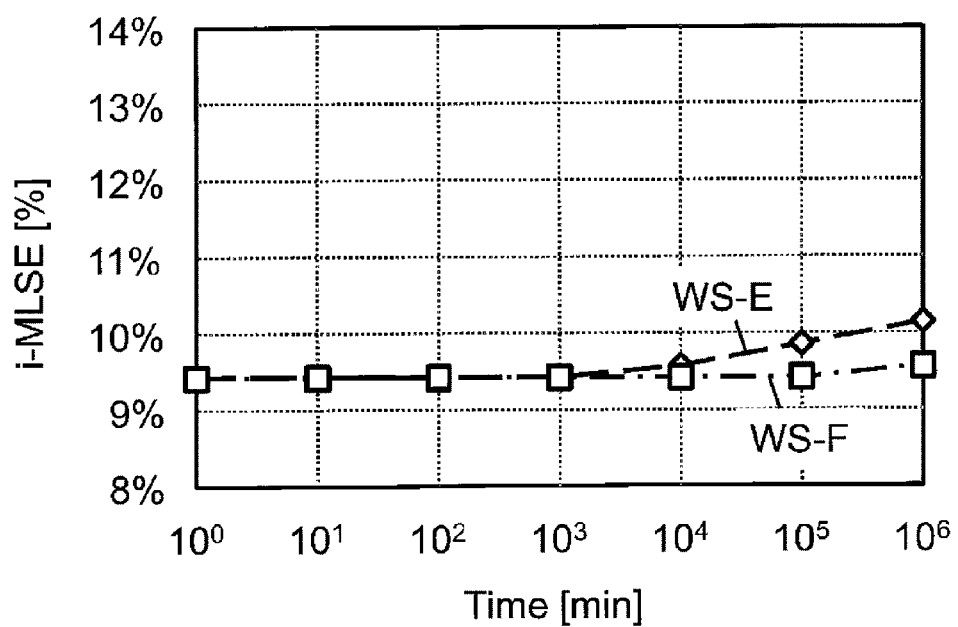
FIG. 16 is an exemplary diagram illustrating a result of measuring a change of i-MLSE due to the thermostatic oven acceleration test in the recording signal of the recording waveform E and the recording waveform F.

The determination of the recording waveform is actually performed according to the sequence of FIG. 14. By taking the aforementioned optical disc as a target, the aforementioned recording waveforms A, B, C, D, E, and F are set as the recording waveforms. In the entire recording waveform, the thermostatic oven acceleration test is to be performed, and the acceleration test is to be ended with $10^6$ minutes (the same condition as FIG. 12). In step S1406, it is determined that the recording waveform in which the edge fluctuation amount after the aged deterioration becomes minimum, as the optimum recording waveform. At a time when the process proceeds to step S1406, the changes in the edge fluctuation amounts of the recording waveform E and the recording waveform F are shown in FIG. 15. The edge fluctuation amounts of the recording waveform E and the recording waveform F immediately after recording are about the same, but it is found that the increase rates are different, and the edge fluctuation amounts are remarkably different after the acceleration test is performed for $10^6$. Incidentally, the recording waveform F of which edge fluctuation amount after aged deterioration is small is determined as the optimum recording waveform (S1406), and the determination of the recording waveform is ended (S1407). In order to confirm that the aged deterioration of the signal that is recorded with the determined recording waveform is suppressed, the thermostatic oven acceleration test that is the same as FIG. 3 is performed with respect to the recording waveform F. That result is shown in FIG. 16. In order to compare the deterioration characteristics, the result with respect to the recording waveform E is shown in FIG. 16. Since the recording signal of the recording waveform F is slower than the recording signal of the recording waveform E in the deterioration rate, it is confirmed that the determination of the recording waveform which suppresses the deterioration of the recording signal is more accurately realized using the sequence of FIG. 14.

The recording waveform determined in the present embodiment may be recorded on the optical disc or stored in the optical disc apparatus. Especially, in a case where the optical disc maker stores on the optical disc the recording waveform that is determined using the determination method of the recording waveform, it is possible for the optical disc apparatus to determine the optimum recording waveform only by reading the recording waveform from the optical disc, without performing the adjustment of the aforementioned recording waveform. On the other hand, in a case where the optical disc does not hold the recording waveform that is determined based on the determination method of the recording waveform, the optical disc apparatus performs the determination method of the recording waveform, which enables to determine the optimum recording waveform. In this case, even the recording waveform may be stored in the memory in FIG. 9.

In the present embodiment, the optical disc of BDXL™ specification is described as an example, but it is apparent that the present embodiment can be implemented with respect to the R type and the RE type of BD, DVD, and CD.

Embodiment 2

In the present embodiment, a case of changing the signal amplitude used for calculation of the edge fluctuation amount of Embodiment 1 is described. Since the unchanged part is the same as Embodiment 1, the description thereof in the present embodiment is omitted.

The signal amplitude used for calculation of the edge fluctuation amount is not limited to the amplitude of the single periodic pattern of 8T signal, for example, it is possible to use the single periodic pattern of the signal length shorter than 8T, or the pattern containing the signal longer than the longest signal of the modulation code in the optical disc.

For example, in a case of using the signal amplitude of the single periodic pattern of 3T signal for normalization, as the pattern for edge fluctuation amount measurement, the single periodic pattern of 3T signal is also recorded. The calculation of the edge fluctuation amount is performed using the signal amplitude of the single periodic pattern of 3T signal that is measured in advance. Specifically, the edge fluctuation amount is calculated by changing "signal amplitude of a predetermined mark length" in Expression 3 and Expression 4 into the signal amplitude of the single periodic pattern of 3T signal.

Actually, in the optical disc of Embodiment 1, the determination of the recording waveform is performed according to the sequence in FIG. 13 using the signal amplitude of the single periodic pattern of 3T signal. As a result, in step S1304, the recording waveforms E and F in FIGS. 11A and 11B become minimum in the edge fluctuation amount, thereby being determined as the optimum recording waveform. Since the result is the same as Embodiment 1, it is confirmed that the recording waveform which properly suppresses the deterioration in the recording signal can be determined even using the single periodic pattern of 3T signal.

Differently from the above, for example, in a case of using the signal amplitude of the single periodic pattern of 10T signal which breaks the modulation rule of 1-7 modulation in BD, for normalization, the single periodic pattern of 10T signal is also recorded as the pattern for measuring the edge fluctuation amount. The calculation of the edge fluctuation amount is performed using the signal amplitude of the single periodic pattern of 10T signal that is measured in advance. Specifically, the edge fluctuation amount is calculated by changing "signal amplitude of a predetermined mark length" in Expression 3 and Expression 4 into the signal amplitude of the single periodic pattern of 10T signal.

Actually, in the optical disk of Embodiment 1, the determination of the recording waveform is performed according to the sequence in FIG. 14 using the signal amplitude of the single periodic pattern of 10T signal. As a result, in step S1406, the recording waveform F in FIGS. 11A and 11B becomes minimum in the edge fluctuation amount after the aged deterioration, thereby being determined as the optimum recording waveform. Since the result is the same as Embodiment 1, it is confirmed that the recording waveform which properly suppresses the deterioration in the recording signal can be determined even by using the single periodic pattern of 10T signal.

Here, the single period as the recording pattern is described as an example, but in a case where the maximum signal length of the recording pattern is coincident with the signal length used to measure the signal amplitude, the recording pattern is not limited to the single period. For example, even if the recording pattern is random, as long as the signal amplitude of the maximum signal length is used for normalization, it is possible to measure the signal amplitude of the maximum signal length by measuring the maximum amplitude of the recorded random signal.

Figure 17:
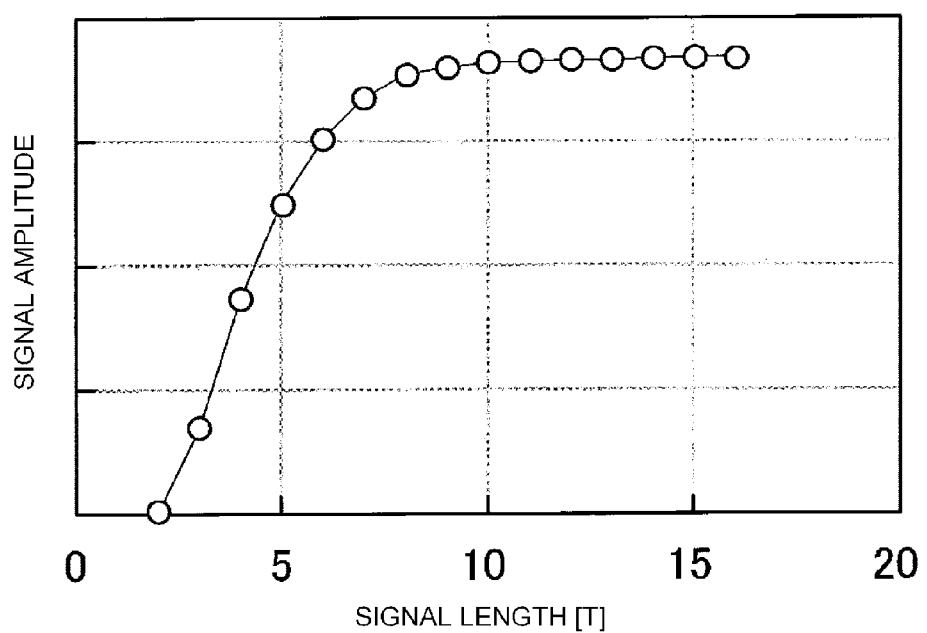
FIG. 17 is an exemplary diagram illustrating a relationship between a signal length and a signal amplitude in a recording signal of BDXL™ specification.

Here, an example of the relationship between the signal length and the signal amplitude in BDXL™ specification is illustrated in FIG. 17. In the signal of BDXL™ specification, it is found that the signal amplitude is saturated in a 10T signal or more, the signal amplitude decreases as the signal length is shortened in less than 10T, and the signal amplitude becomes substantially zero in 2T. Based on the principal of FIG. 6, since it is possible to correctly evaluate the fluctuation amount of the mark edge position by normalizing in the maximum amplitude of a step response, the signal length in which the signal amplitude is saturated may be used in the calculation of the edge fluctuation amount. Especially, in a case of using the saturated signal amplitude, in each recording waveform, the signal lengths used to measure the signal amplitude may be different. However, in a view point of determination of the recording waveform, it is possible to use the signal of which the signal amplitude is not saturated. In this case, the signal length used to measure the signal amplitude in each recording waveform may be fixed and compared with the edge fluctuation amount to be calculated.

The method of the present embodiment can be applied to the following embodiments, and the same effect is achieved in each embodiment.

Embodiment 3

In the present embodiment, a case of changing the noise measurement method and the pattern for measurement of the edge fluctuation amount in Embodiment 1 is described. Since the unchanged part is the same as Embodiment 1, the description thereof is omitted in the present embodiment.

The method of measuring various noises is not limited to a method of using FFT function in the noise measurement and calculation section of the controller 22, but for example, noises may be directly measured from the fluctuation amount of the reading signal. In this case, the noise is measured as a level variation amount (RMS: root-mean-square) from the average value of the reading signal level.

In the method of the present embodiment, the system noise ($\Delta V_{system}$) is measured from the reading signal in a state where an LD does not emit. The sum value ($\Delta V_{LD+Disc}$) of the laser noise and the disc noise is calculated using the noise ($\Delta V_{total-1}$) measured when the unrecorded part of the optical disc is reproduced by the operation of Expression 5 below.

$$\Delta V_{LD+Disc} = \sqrt{(\Delta V^2_{total-1} - \Delta V^2_{system})} \qquad \text{Expression 5}$$

Here, the average level of the reading signal of the unrecorded part is measured.

The level fluctuation amount ($\Delta V_{fluc}$) is calculated using the noise ($\Delta V_{total-2}$) measured when reading the region in which the pattern for measuring the edge fluctuation amount is recorded and a ratio $\alpha$ of the reading signal to the average level of the reading signal of the unrecorded part by the operation of Expression 6 below.

$$\Delta V_{fluc} = \sqrt{\Delta V^2_{total-2} - \alpha \Delta V^2_{LD+Disc} - \Delta V^2_{system}} \qquad \text{Expression 6}$$

Here, in a case where the signal length of the optical resolution or more is included in the pattern for measuring the edge fluctuation amount, the signal component is included in the measured noise. In this case, the superimposed signal waveform of the same signal sequence from the reading signal is generated, and the noise ($\Delta V_{total-2}$) is measured using the level variation amount from the average waveform of the superimposed signal waveform. In a case where the pattern for measuring the edge fluctuation amount is set to the single period of an 8T signal, an example of the superimposed signal is illustrated in FIG. 18A. It is possible to measure the level fluctuation amount by the above method, and to calculate the edge fluctuation amount. In the present method, since the noise measurement including the level fluctuation amount is performed from the superimposed signal waveform, the noise measurement may be performed even in the optical disc apparatus without FFT function, and even with respect to the pattern other than the single periodic pattern in which the signal component cannot be eliminated by the FFT function.

Then, in a case of using the single periodic pattern of the signal length of the optical resolution or less as the pattern for measuring the edge fluctuation amount, the signal component of the pattern for measuring the edge fluctuation amount is not entirely generated. For this reason, the elimination operation of the signal component is not necessary in the level fluctuation amount calculation, and it is possible to facilitate the measurement of the edge fluctuation amount. Since the same effect is achieved in a case where the pattern for measuring the edge fluctuation amount is applied to Embodiment 1, the measurement of the edge fluctuation amount is facilitated.

Actually, in the optical disk of Embodiment 1, the determination of the recording waveform by the noise measurement of the present embodiment is performed according to the sequence in FIG. 13. Here, as the pattern for measuring the edge fluctuation amount, the single periodic pattern of a 2T signal (less than an optical resolution) in BDXL™ is used. The superimposed signal waveform generated from the reading signal of the pattern for measuring the edge fluctuation amount is illustrated in FIG. 18B. Since the 2T signal of BDXL™ is less than the optical resolution, it is possible to confirm that the signal component is not included in the superimposed signal waveform. For this reason, without generating the superimposed signal waveform, the calculation of the noise $\Delta V_{total-2}$ is directly performed from the average waveform of a direct reading signal. As a result of the calculation of the edge fluctuation amount with respect to each recording waveform, in step S1304, the recording waveforms E and F in FIGS. 11A and 11B becomes minimum in the edge fluctuation amount, thereby being determined as the optimum recording waveform. Since the result is the same as Embodiment 1, it is confirmed that the recording waveform which properly suppresses the deterioration in the recording signal can be determined even using the noise measurement method in the present embodiment and the single periodic pattern of the signal length of the optical resolution or less as the pattern for measuring the edge fluctuation amount.

It is apparent that the method of the present embodiment can be applied to the following embodiments, and the same effect is achieved in each embodiment. In addition, V symbol is used in order to distinguish the noise measured in the present embodiment with the noise in Embodiment 1. However, since the V of the present embodiment and the N of Embodiment 1 are essentially the same dimension, Expression 6 and Expression 2 are equivalent expressions.

Embodiment 4

In the present embodiment, a case of changing the acceleration test method in determination of the recording waveform using the sequence of FIG. 14 of Embodiment 1 is described. Since the unchanged part is the same as Embodiment 1, the description thereof in the present embodiment is omitted.

The acceleration test method is not limited to the thermostatic oven acceleration test, for example, the reading light acceleration test using the reading light may be used. The reading light acceleration test is a method to continue to reproduce the signal with the reading power higher than the normal reading power to cause the recording signal to be deteriorated. In this method, differently from the thermostatic oven acceleration test, in order to directly heat only the recording film, the acceleration test is performed at the temperature higher than the thermostatic oven acceleration. Accordingly, it is possible to realize the deterioration of the recording signal in a time shorter than the thermostatic oven acceleration test.

In the reading light acceleration test, the reading power Pr that is used is set according to a predetermined condition. For example, the reading power Pr (1) of the optical disc that is stored by the optical disc apparatus, or the suggested reading power Pr (2) that is determined in the specification are read and the reading power is set to be higher than the Pr (1) or the Pr (2). Otherwise, the reading power Pr (3) that is recorded on the optical disc is read and the reading power is set to be higher than Pr (3). Here, there is a case of DC emitting a laser or a case of superimposing a high frequency to a laser to emit, at a time of reading. There are a case of emission with a high frequency superimposition and a case of causing the recording signal to be deteriorated in a time shorter than DC emission. As the reading power is set high, the deterioration of the recording signal is promoted, thus the acceleration test time becomes short. However, in a case of setting the reading power excessively high, the deterioration mode of the recording film may change or material other than the recording film may be deteriorated. For this reason, it is necessary to set the reading power used in a reading light acceleration test within the range that is not different from the deterioration mode in the thermostatic oven acceleration test. As a result of performing the reading light acceleration test in advance with a reading velocity of 2× and the reading power of 2.0 mW with respect to the optical disc used in the present embodiment, the deterioration of a substrate that does not occur in the thermostatic oven acceleration test is observed. On the other hand, as a result of performing the reading light acceleration test with the reading velocity of 2× and the reading power of 1.7 mW, the deterioration of a substrate does not occur, and the deterioration of the same recording signal as the thermostatic oven acceleration test can be confirmed. Therefore, in the present embodiment, the acceleration condition of the reading light acceleration test is set as the reading velocity of 2× and the reading power of 1.7 mW. Here, in a case where the deterioration is excessively fast or excessively late in the set acceleration condition, the acceleration condition may be changed.

The time in the reading light acceleration test in step S1405 of FIG. 14 is managed by, for example, a predetermined number of times of reproduction or a predetermined reproduction time. In the present embodiment, the acceleration test is managed by time, and each acceleration test is performed for about 8.3 minutes (when converted to the number of times of reproduction, it is 5873 time intervals). Further, the necessity of the continuation of the acceleration test in step S1404 is determined by whether or not, for example, an edge fluctuation amount of the reading signal, a signal quality, L-SEAT jitter, L-SEAT shift, β, Asymmetry, and the like reach a predetermined threshold value or a predetermined variation amount. In the present embodiment, the determination is performed by whether or not the variation amount of β reaches 2% and the variation amount of L-SEAT jitter reaches 5%.

Figure 19:
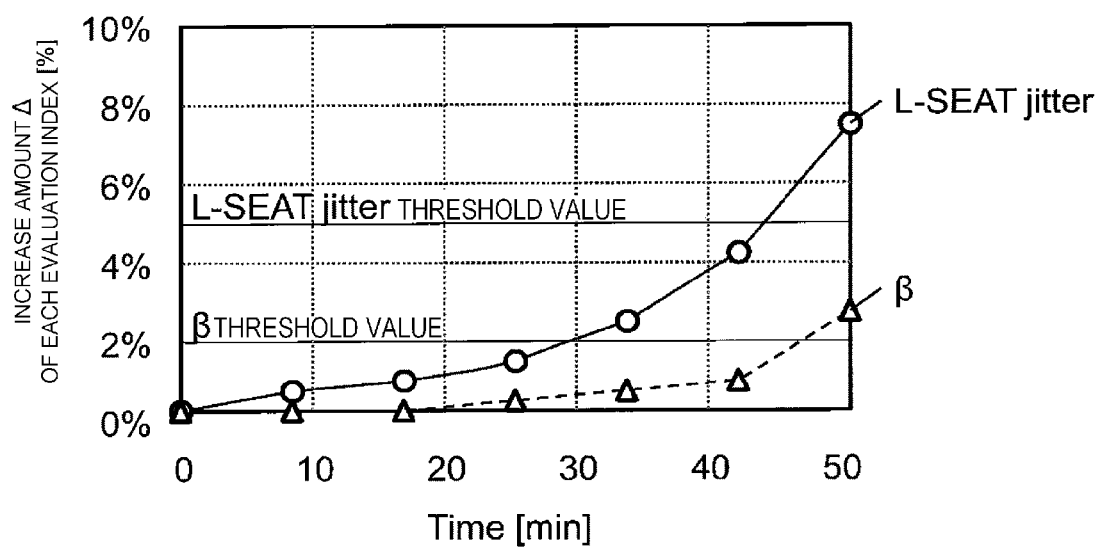
FIG. 19 is an exemplary diagram of a result of measuring changes of L-SEAT jitter and β due to a reading light acceleration test in a recording signal of a recording waveform C.

Actually, in the optical disc of Embodiment 1, according to the sequence of FIG. 14, using the reading light acceleration test in step S1405, the determination of the recording waveform is performed. As an example of the deterioration of the recording signal by the reading light acceleration test, the changes in L-SEAT jitter and β of the recording signal of the recording waveform C are illustrated in FIG. 19. In the recording signal of the recording waveform C, at a time when the accumulated time of the reading light acceleration test reaches 50 minutes, L-SEAT jitter increases by 7.5% and p increases 2.8%, it is determined that the acceleration test is terminated. After the acceleration test is terminated with respect to the recording signal of the entire recording waveform, if the edge fluctuation amounts are compared after aged deterioration in step S1406, the recording waveform F in FIGS. 11A and 11B becomes minimum in the edge fluctuation amount, thereby being determined as the optimum recording waveform. Since the result is the same as Embodiment 1, it is confirmed that the recording waveform which properly suppresses the deterioration in the recording signal can be determined even by using the reading light acceleration test. Here, the recording waveform in which the edge fluctuation amount becomes minimum is selected, but after the acceleration test, the recording waveform in which the increase amount of the edge fluctuation amount becomes minimum may be selected.

The method of the present embodiment can be applied to the following embodiments, and the same effect is achieved in each embodiment.

Embodiment 5

In the present embodiment, a case of changing the calculation method of the edge fluctuation amount in Embodiment 1 is described. Since the unchanged part is the same as Embodiment 1, the description thereof is omitted in the present embodiment.

The calculation method of the edge fluctuation amount is not limited to the calculation method using Expression 3 and Expression 4 in Embodiment 1. For example, the edge fluctuation amount may be calculated by the operation of Expression 7 below, that is, the noise of the level direction of the reading signal of the measurement pattern.

(EDGE FLUCTUATION AMOUNT)=(NOISE WHEN READING PATTERN FOR MEASURING EDGE FLUCTUATION AMOUNT)/(AMPLITUDE OF PREDETERMINED MARK LENGTH)   Expression 7

In this method, it is not necessary to measure and separate various noises and calculate the level fluctuation amount, thereby easily realizing the measurement of the edge fluctuation amount. Here, the noise occurring when the edge fluctuation amount measurement pattern is reproduced naturally includes a system noise, a laser noise, and a disc noise. However, in comparison of recording waveforms in the optical disc which dominantly has the level fluctuation amount, or the same optical disc, the recording waveform which properly suppresses the deterioration in the recording signal can be determined even using the edge fluctuation amount of Expression 7. Particularly, the present method is to measure an edge fluctuation amount which provides a determination method of the recording waveform which properly suppresses the deterioration in the recording signal even with respect to the optical disc without a function of separating various noises.

Actually, in the optical disc of Embodiment 1, only the calculation method of the edge fluctuation amount is changed from Embodiment 1 and the recording waveform is determined. As a result, in step S1304, the recording waveforms E and F in FIGS. 11A and 11B become minimum in the edge fluctuation amount, thereby being determined as the optimum recording waveforms. Since the result is the same as Embodiment 1, it is confirmed that the recording waveform which properly suppresses the deterioration in the recording signal can be determined also by using the calculation method of the edge fluctuation amount of Expression 7.

As a calculation method of the edge fluctuation amount different from the above, there is a method using the time fluctuation amount that is disclosed in JP-A-2004-200868. In this case, the edge fluctuation amount is calculated by an operation of Expression 8 below.

(EDGE FLUCTUATION AMOUNT)=(TIME FLUCTUATION AMOUNT)/(CLOCK UNIT)/(AMPLITUDE OF MAXIMUM MARK LENGTH)   Expression 8

Here, the time fluctuation amount is the fluctuation amount in the time axis direction in the superimposed signal of the pattern for measuring the edge fluctuation amount. Similar to the above, the present method is applied to the comparison of the recording waveforms in the optical disk which dominantly has the level fluctuation amount, or the same optical disc. In addition, the present method may be used in an apparatus capable of measuring the time fluctuation amount such as TIA.

Actually, in the optical disc of Embodiment 1, only the calculation method of the edge fluctuation amount is changed from Embodiment 1 and the recording waveform is determined. As a result, in step S1304, the recording waveforms E and F in FIGS. 11A and 11B become minimum in the edge fluctuation amount, thereby being determined as the optimum recording waveforms. Since the result is the same as Embodiment 1, it is confirmed that the recording waveform which properly suppresses the deterioration in the recording signal can be determined even by using the calculation method of the edge fluctuation amount of Expression 8.

The method of the present embodiment can be applied to the following embodiments, and the same effect is achieved in each embodiment.

Embodiment 6

In the present embodiment, a case of changing the determination method of the recording waveform in Embodiment 1 is described. Since the unchanged part is the same as Embodiment 1, the description thereof is omitted in the present embodiment.

The determination methods of the recording waveform in step S1304 in FIG. 13 and step S1406 in FIG. 14 are not limited to a method of determining the recording waveform based only on the edge fluctuation amount, but the methods may determine the recording waveform using other evaluation indexes or combining the indexes in a case where the recording waveform of which the edge fluctuation amount becomes minimum is not uniquely determined.

Figure 20:
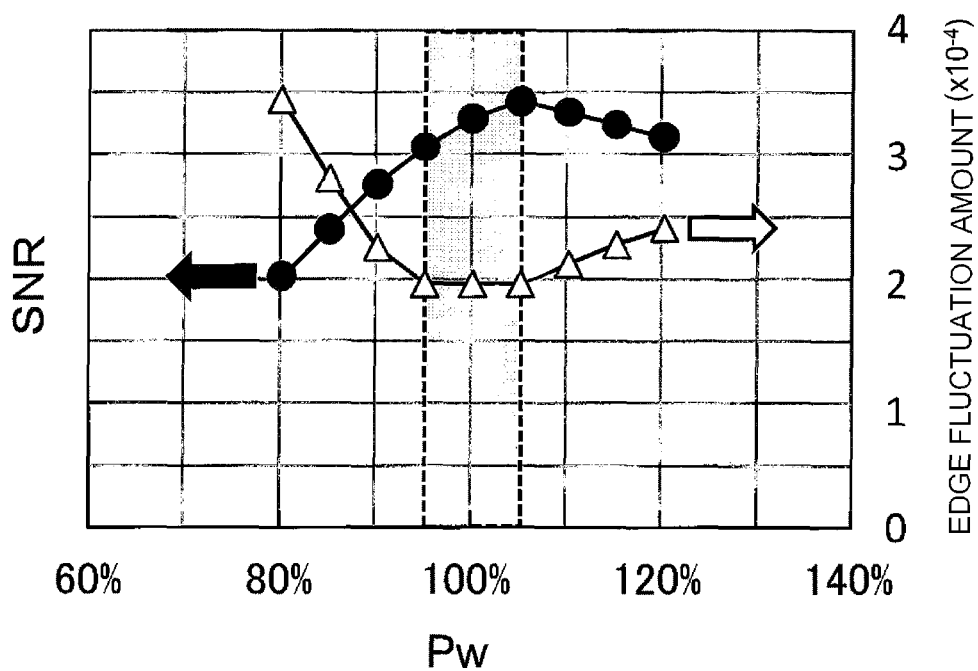
FIG. 20 is an exemplary diagram of a result of measuring SNR and the edge fluctuation amount of a signal which is recorded while changing recording power in the recording waveform E.
Figure 21:
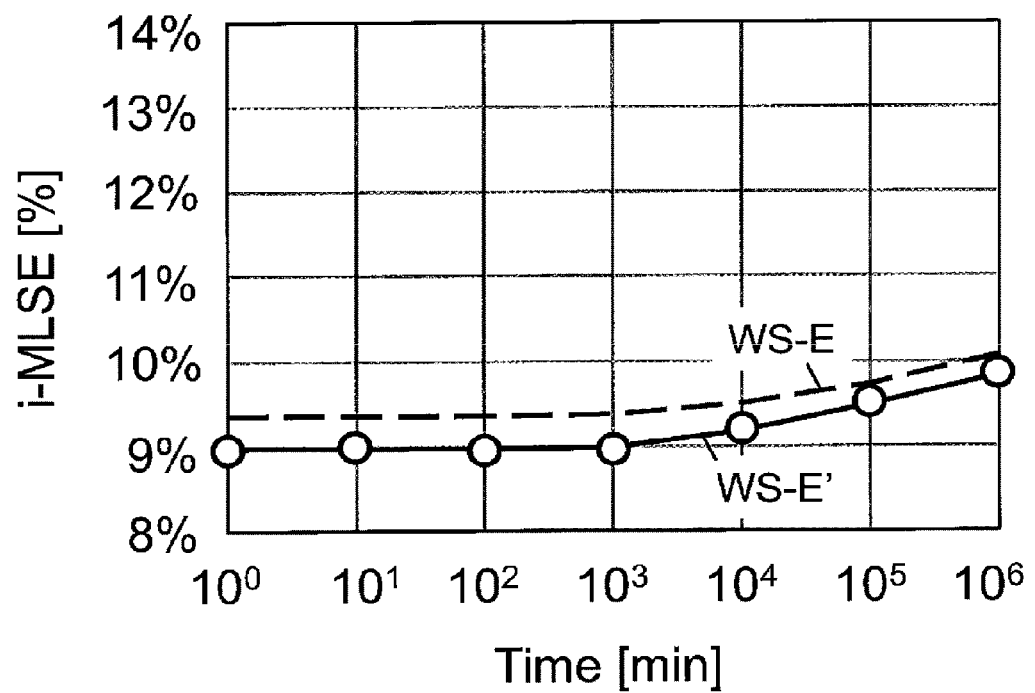
FIG. 21 is an exemplary diagram illustrating a result of measuring a change of i-MLSE due to the thermostatic oven acceleration test in recording signals of a recording waveform E and a recording waveform E'.

For example, as the evaluation index in determination of the recording waveform, S/N, i-MLSE, L-SEAT shift, L-SEAT jitter, and the like may be used. In the recording waveform E in FIGS. 11A and 11B, in a case of changing the recording power, the results of measurement of the edge fluctuation amount and the variation in SNR are illustrated in FIG. 20. The edge fluctuation amount is almost constant in a region in which the recording power is from 95% to 105%, thus it is found that it is difficult to determine the recording waveform based on the minimum value of the edge fluctuation amount. In this case, other evaluation indexes are combined in addition to the edge fluctuation amount, whereby the optimum recording waveform is determined. For example, in a case of using SNR as the other evaluation indexes, in a range of 95% to 105% in which the edge fluctuation amount becomes small, the recording condition in which SNR becomes highest may be determined as the optimum recording condition. In this case, the optimum recording waveform is determined as Pw 105%. The determined recording waveform is set to the recording waveform E', and the result of thermostatic oven acceleration test of the signal recorded with the recording waveform E' is illustrated in FIG. 21. FIG. 21 illustrates the deterioration characteristics of the signal that is recorded with the recording waveform E in FIGS. 11A and 11B. Since SNR of the recording signal with the recording waveform E' is high with compared to the recording waveform E, it is found that the initial i-MLSE is lowered. On the other hand, since the deterioration characteristics of the above recording signals are the same, it is confirmed that the determination of the recording waveform becomes more accurate by combining other evaluation indexes in addition to the edge fluctuation amount.

Although SNR is used as other evaluation indexes in the present embodiment, indexes such as L-SEAT shift, L-SEAT jitter, and i-MLSE may be used. The evaluation index may be selected depending on the characteristic of the medium.

The method of the present embodiment can be applied to the following embodiments, and the same effect is achieved in each embodiment.

Embodiment 7

In the present embodiment, a method of determining a recording waveform based on the information that is recorded on the optical disc is described.

Figure 22:
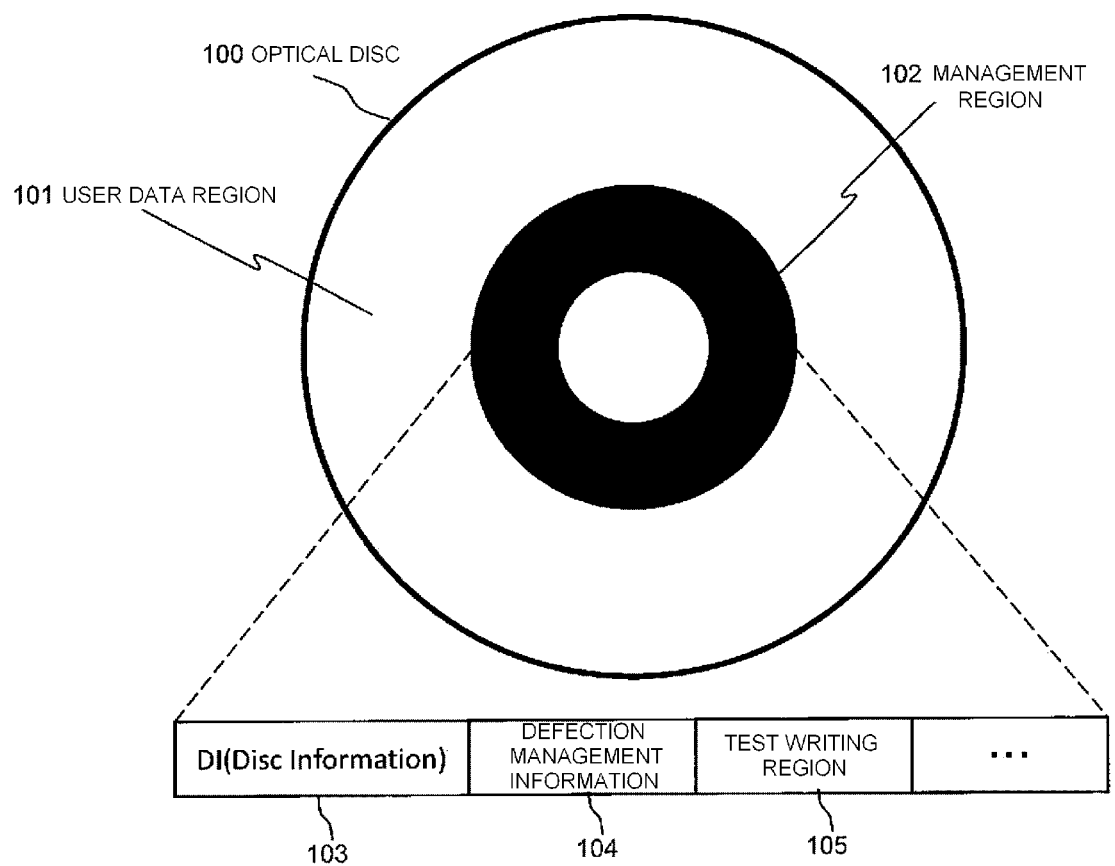
FIG. 22 is an exemplary diagram illustrating a configuration of an optical disc relating to an embodiment of the present invention.

Firstly, a description of a configuration of an optical disc used in the present embodiment is made using FIG. 22. The optical disc 100 has a user data region 101 and a management region 102. In the management region 102, there are DI (Disc Information) 103, defection management information 104, and regions such as a test writing region 105. Especially, inherent information of the optical disc is recorded in the DI 103. The optical disc 100 is equal to the optical disc used in Embodiment 1, and information on the recording waveform F in FIGS. 11A and 11B as a suggested recording waveform is also recorded in addition to identification information of the optical disc 101 in the DI 103. The detailed information of the DI 103 is arranged in FIG. 23. Identification information of the optical disc 101 is mainly stored in medium inherent information, and information on recording waveform F is recorded in recording power information and recording pulse information as parameter values for setting the recording waveform.

Using the optical disc, the determination of the recording power is actually performed in the optical disc apparatus. Since the optical disc apparatus used in the present embodiment is the same as Embodiment 1, the description thereof is omitted.

Firstly, the optical disc apparatus reproduces the management region of the optical disc, and acquires DI information, and the like. According to the acquired information, the type of the optical disc and the recording and reading condition are confirmed, and the optical disc apparatus is adjusted to the condition that meets the optical disc. Next, the optical disc apparatus generates a suggested recording waveform based on the acquired information, and determines the suggested recording waveform as the recording waveform to be used for recording. At this time, in order to adjust the sensitivity variation of the optical disc, the optical disc apparatus may perform an OPC, and the like to adjust the recording waveform. The optical disc apparatus terminates the determination of the recording waveform. Then, if the optical disc apparatus intends to perform recording, the optical disc apparatus moves to the recording operation. Since the recording waveform determined by the above is the recording waveform F in FIGS. 11A and 11B, it is possible to record the signal that is hardly deteriorated as shown in FIG. 16. Consequently, it is confirmed that the recording signal in which the deterioration in the recording signal is suppressed can be determined by the above method.

Although the recording waveform is acquired from the optical disc in the above, in a case where a recording waveform in consideration of the aged deterioration is not recorded on the optical disc, the optical disc apparatus may determine the recording waveform similar to Embodiment 1. In this case, if the recording waveform generated by the optical disc apparatus is recorded on the optical disc, or stored in the optical disc apparatus, when performing recording of the optical disc next time, the recording waveform which suppresses the deterioration in the recording signal can be determined by the sequence of the present embodiment. Further, in a case where the optical disc apparatus stores the recording waveform in consideration of the aged deterioration, the recording waveform that is read from the optical disc apparatus is preferably used.

Embodiment 8

In the present embodiment, a method of evaluating and selecting the recording performance of an optical disc using the edge fluctuation amount is described. This method corresponds to a method of selecting an optical disc in a medium manufacturer.

The recording waveform to be used in recording to the optical disc is generally common to each type of the optical disc and a layer, the information is recorded on the DI of the management region of the optical disc. However, since there is manufacturing variation in the optical disc, it may not realize a good quality of recording with the recording waveform that is provided in DI. For this reason, it is necessary for a disc manufacturer to evaluate and select the recording performance of each optical disc.

In the present embodiment, ten optical discs (optical disc 1 to 10) having the same structure and characteristic as FIG. 22 are prepared, and the evaluation and the selection of the recording performance for the disks are performed. Since the optical disc apparatus that is used in the present embodiment is the same as the Embodiment 1, the description thereof is omitted. Further, in the present embodiment, the recording waveform E of FIGS. 11A and 11B is set to a common recording waveform used for recording.

Firstly, with respect to each optical disc, recording is performed using the recording waveform E and the edge fluctuation amount is calculated. Since the detailed sequences of the edge fluctuation amount calculation are equal to the sequences of step S1301 to S1303 in FIG. 13 in the embodiment 1, the detailed description is omitted. The calculated edge fluctuation amount for each disc is arranged in FIG. 24. Results of calculation of the life span using the increase characteristic of the edge fluctuation amount of the recording waveform E in FIG. 15 are listed in FIG. 24. It is found that each optical disc has different life span due to a variation. Next, selection is performed based on the life span of each optical disc. The object of the present embodiment is to select an optical disc that can be kept for years in a standard storage condition (temperature 25° C./relative humidity 60%). Accordingly, the basis of selection is set to a life span of 50 years or more. As a result, it is determined that the optical discs 1 and 9 are poor, and the remaining eight discs are good. It is apparent from FIG. 24 that eight good optical discs that are selected above can be kept for 50 years or more. Accordingly, it is confirmed that the selection of an optical disc according to any storage life span is properly performed by an evaluation method of the recording performance and a selection method of an optical disc.

What is claimed is:

1. An information recording method comprising:
   acquiring a reading signal by reading a medium having a predetermined recording pattern recorded therein using a predetermined recording waveform;
   calculating an edge fluctuation amount from the reading signal;
   determining a recording waveform based on the edge fluctuation amount; and
   recording information on the medium using the recording waveform;
   wherein the calculating an edge fluctuation amount includes:
   measuring a level fluctuation amount containing a noise due to a fluctuation of a mark edge position from the reading signal; and
   dividing the level fluctuation amount by a predetermined signal amplitude.

2. An information recording method comprising:
   acquiring a reading signal by reading a medium having a predetermined recording pattern recorded therein using a predetermined recording waveform;

calculating an edge fluctuation amount from the reading signal;
determining a recording waveform based on the edge fluctuation amount; and
recording information on the medium using the recording waveform;
wherein the calculating an edge fluctuation amount includes:
accumulating a mark length of the recording pattern to the level fluctuation amount and further dividing by a predetermined signal amplitude.

3. The information recording method according to claim 2, wherein the level fluctuation amount is a noise in which a system noise, a laser noise and a disc noise are removed from a noise of a level direction of the reading signal.

4. An information recording method comprising:
acquiring a reading signal by reading a medium having a predetermined recording pattern recorded therein using a predetermined recording waveform;
calculating an edge fluctuation amount from the reading signal;
determining a recording waveform based on the edge fluctuation amount; and
recording information on the medium using the recording waveform;
wherein the edge fluctuation amount is obtained by dividing a noise of the reading signal by a predetermined signal amplitude.

5. An information recording method comprising:
acquiring a reading signal by reading a medium having a predetermined recording pattern recorded therein using a predetermined recording waveform;
calculating an edge fluctuation amount from the reading signal;
determining a recording waveform based on the edge fluctuation amount; and
recording information on the medium using the recording waveform;
wherein the calculating an edge fluctuation amount includes:
measuring a time fluctuation amount of a time direction of the reading signal; and
dividing the time fluctuation amount by a clock unit and further dividing by a signal amplitude of a maximum mark length of the recording pattern.

6. The information recording method according to claim 1, wherein the recording pattern is a single periodic pattern of a recording mark of a signal length in which a signal amplitude is saturated.

7. The information recording method according to claim 1, wherein the recording pattern is a single periodic pattern of a recording mark of a signal length less than an optical resolution.

8. The information recording method according to claim 1, wherein the recording pattern includes a recording mark of a signal length of an optical resolution or more, and
wherein the recording pattern generates a superimposed signal waveform of a same signal sequence from the reading signal, calculates a level variation amount from the superimposed signal waveform, and calculates the edge fluctuation amount using the level variation amount.

9. The information recording method according to claim 2, wherein the recording pattern is a single periodic pattern of a recording mark of a signal length less than an optical resolution, and
the signal obtained by reading the single periodic pattern is set to the level fluctuation amount.

10. The information recording method according to claim 1, wherein the recording waveform is determined such that the edge fluctuation amount becomes minimum.

11. The information recording method according to claim 1, wherein the recording waveform is determined such that the edge fluctuation amount becomes a threshold value or less.

12. The information recording method according to claim 1, wherein the recording waveform is determined such that the edge fluctuation amount is a threshold value or less and meets other evaluation indexes of the reading signal.

13. The information recording method according to claim 1, further comprising:
performing an acceleration test with respect to a predetermined recording pattern; and
calculating the edge fluctuation amount of the reading signal after the acceleration test.

14. An information recording apparatus comprising:
a light source;
means for irradiating light from the light source to an information recording medium;
an edge fluctuation amount calculator to calculate an edge fluctuation amount by:
measuring a level fluctuation amount containing a noise due to a fluctuation of a mark edge position from a reading signal; and
dividing the level fluctuation amount by a predetermined signal amplitude; and
means for generating a recording waveform of light to be irradiated to the information recording medium based on parameters of a recording waveform that is determined based on the fluctuation amount of a recording mark.

15. A medium estimating method comprising:
reading a medium in which a predetermined recording pattern is recorded using a predetermined recording waveform and calculating an edge fluctuation amount of a recording mark; and
evaluating a recording performance of an information recording medium based on the edge fluctuation amount;
wherein the calculating an edge fluctuation amount includes:
measuring a level fluctuation amount containing a noise due to a fluctuation of a mark edge position from the reading signal; and
dividing the level fluctuation amount by a predetermined signal amplitude.

* * * * *